(12) United States Patent
Schmidt et al.

(10) Patent No.: US 7,841,524 B2
(45) Date of Patent: Nov. 30, 2010

(54) POS-BASED CHECKOUT SYSTEM CONFIGURED TO ENABLE THE READING OF CODE SYMBOLS ON CASHIER AND CUSTOMER SIDES THEREOF, DURING A RETAIL TRANSACTION BEING CARRIED OUT AT A POINT-OF-SALE (POS) STATION

(75) Inventors: Mark Schmidt, Williamstown, NJ (US); Garrett Russell, Wilmington, DE (US); Timothy Good, Clementon, NJ (US)

(73) Assignee: Metrologic Instruments, Inc., Blackwood, NJ (US)

( * ) Notice: Subject to any disclaimer, the term of this patent is extended or adjusted under 35 U.S.C. 154(b) by 0 days.

(21) Appl. No.: 11/789,442

(22) Filed: Apr. 24, 2007

(65) Prior Publication Data

US 2007/0257110 A1 Nov. 8, 2007

Related U.S. Application Data

(63) Continuation of application No. 11/401,091, filed on Apr. 10, 2006, now abandoned, which is a continuation of application No. 10/924,342, filed on Aug. 23, 2004, now abandoned, which is a continuation of application (Continued)

(51) Int. Cl.
*G06K 15/00* (2006.01)
(52) U.S. Cl. .................. 235/383; 235/385; 235/462.01; 235/462.13; 235/462.14; 235/462.32; 235/462.43; 235/375; 902/30; 705/16; 705/17; 705/20; 705/21; 705/22; 705/416; 177/25.15

(58) Field of Classification Search ............... 235/383, 235/385, 462.01, 462.13, 462.14, 462.32, 235/462.43, 375; 902/30; 705/16, 17, 20, 705/21, 22, 23, 24, 25, 416; 177/25.15
See application file for complete search history.

(56) References Cited

U.S. PATENT DOCUMENTS 3,902,048 A 8/1975 Fleischer et al.

(Continued)

FOREIGN PATENT DOCUMENTS

EP 0 663 643 A2 7/1995
WO WO 99/01839 1/1999

OTHER PUBLICATIONS

Product Brochure for the Magellan SL 360-Degree Scanner/Scale by PSC Inc., Webster, NY, Feb. 2000, pp. 1-2.
2003 Search Report for International Application No. PCT/US03/01738.

*Primary Examiner*—Michael G Lee
*Assistant Examiner*—Kristy A Haupt
(74) *Attorney, Agent, or Firm*—Thomas J. Perkowski, Esq., P.C.

(57) ABSTRACT

Novel POS-based bar code symbol reading systems are disclosed having an integrated customer-kiosk terminal. Also disclosed are novel POS-based bar code reading cash register Systems having integrated Internet-enabled customer-kiosk terminals.

12 Claims, 29 Drawing Sheets

Related U.S. Application Data

(63) No. 10/125,303, filed on Apr. 17, 2002, now abandoned, which is a continuation of application No. 10/053,486, filed on Jan. 16, 2002, now abandoned, which is a continuation-in-part of application No. 10/045,577, filed on Jan. 11, 2002, now Pat. No. 6,918,540, and a continuation-in-part of application No. 10/045,605, filed on Jan. 11, 2002, now Pat. No. 6,830,190, and a continuation-in-part of application No. 09/990,585, filed on Nov. 21, 2001, now Pat. No. 7,028,899, and a continuation-in-part of application No. 09/999,687, filed on Oct. 31, 2001, now Pat. No. 7,070,106, and a continuation-in-part of application No. 09/954,477, filed on Sep. 17, 2001, now Pat. No. 6,736,321, and a continuation-in-part of application No. 09/551,887, filed on Apr. 18, 2000, now Pat. No. 6,758,402, and a continuation-in-part of application No. PCT/US01/44011, filed on Nov. 21, 2001.

(56) References Cited

U.S. PATENT DOCUMENTS

| | | | |
|---|---|---|---|
| 4,652,732 A | 3/1987 | Nicki | |
| 4,766,298 A | 8/1988 | Meyers | |
| 5,019,694 A | 5/1991 | Collins | |
| 5,042,619 A | 8/1991 | Kohno | |
| 5,083,638 A | 1/1992 | Schneider | |
| 5,153,585 A * | 10/1992 | Negishi et al. | 705/21 |
| 5,155,345 A | 10/1992 | Ito | |
| 5,206,491 A | 4/1993 | Katoh et al. | |
| 5,229,588 A | 7/1993 | Detwiler et al. | |
| 5,256,863 A * | 10/1993 | Ferguson et al. | 705/21 |
| 5,426,282 A | 6/1995 | Humble | |
| 5,459,308 A | 10/1995 | Detwiler et al. | |
| 5,491,328 A | 2/1996 | Rando | |
| 5,495,097 A | 2/1996 | Katz et al. | |
| 5,557,093 A | 9/1996 | Knowles et al. | |
| 5,684,289 A | 11/1997 | Detwiler et al. | |
| 5,691,528 A | 11/1997 | Wyatt et al. | |
| 5,723,852 A | 3/1998 | Rando et al. | |
| 5,754,655 A * | 5/1998 | Hughes et al. | 705/17 |
| 5,801,370 A * | 9/1998 | Katoh et al. | 235/462.01 |
| 5,834,708 A | 11/1998 | Svetal et al. | |
| 5,837,988 A | 11/1998 | Bobba et al. | |
| 5,838,536 A | 11/1998 | Miyazawa et al. | |
| 5,869,827 A | 2/1999 | Rando | |
| 5,886,336 A * | 3/1999 | Tang et al. | 235/462.43 |
| 5,950,173 A | 9/1999 | Perkowski | |
| 6,098,885 A | 8/2000 | Knowles et al. | |
| 6,112,857 A | 9/2000 | Morrison | |
| 6,167,381 A | 12/2000 | Swaine et al. | |
| 6,179,206 B1 * | 1/2001 | Matsumori | 235/383 |
| 6,213,397 B1 | 4/2001 | Rando | |
| 6,223,986 B1 | 5/2001 | Bobba et al. | |
| 6,237,852 B1 | 5/2001 | Svetal et al. | |
| 6,325,290 B1 | 12/2001 | Walter et al. | |
| 6,330,973 B1 | 12/2001 | Bridgelall et al. | |
| 6,354,498 B1 | 3/2002 | Lutz | |
| 6,363,366 B1 | 3/2002 | Henty | |
| 6,427,915 B1 | 8/2002 | Wike, Jr. et al. | |
| 6,457,644 B1 | 10/2002 | Collins, Jr. et al. | |
| 6,502,749 B1 * | 1/2003 | Snyder | 235/383 |
| 6,539,422 B1 * | 3/2003 | Hunt et al. | 709/217 |
| 6,588,549 B2 * | 7/2003 | Wike et al. | 186/61 |
| 6,834,596 B2 * | 12/2004 | Kerber | 108/42 |
| 6,974,084 B2 | 12/2005 | Bobba et al. | |
| 2001/0017320 A1 | 8/2001 | Knowles et al. | |
| 2002/0015055 A1 | 2/2002 | Foran | |
| 2002/0085007 A1 | 7/2002 | Nelson et al. | |
| 2003/0208560 A1 * | 11/2003 | Inoue et al. | 709/219 |

* cited by examiner

Fourth Illustrative Embodiment

Cash Register And Customer Kiosk Terminal

POS-BASED CHECKOUT SYSTEM CONFIGURED TO ENABLE THE READING OF CODE SYMBOLS ON CASHIER AND CUSTOMER SIDES THEREOF, DURING A RETAIL TRANSACTION BEING CARRIED OUT AT A POINT-OF-SALE (POS) STATION

CROSS-REFERENCE TO RELATED U.S. APPLICATIONS

This is a Continuation of U.S. application Ser. No. 11/401,091 filed Apr. 10, 2006, now abandoned; which is a Continuation of application Ser. No. 10/924,342 filed Aug. 23, 2004, now abandoned; which is a Continuation of application Ser. No. 10/125,303 filed Apr. 17, 2002, now abandoned; which is a Continuation of application Ser. No. 10/053,486 filed Jan. 16, 2002, now abandoned, which is a Continuation-in-Part of application Ser. No. 10/045,577 filed Jan. 11, 2002, now U.S. Pat. No. 6,918,540; and Ser. No. 10/045,605 filed Jan. 11, 2002, now U.S. Pat. No. 6,830,190; Ser. No. 09/990,585 filed Nov. 21, 2001, now U.S. Pat. No. 7,028,899; Ser. No. 09/999,687 filed Oct. 31, 2001, now U.S. Pat. No. 7,070,106; Ser. No. 09/954,477 filed Sep. 17, 2001, now U.S. Pat. No. 6,736,321; and Ser. No. 09/551,887 filed Apr. 18, 2000, now U.S. Pat. No. 6,758,402; and International application No. PCT/US01/44011 filed Nov. 21, 2001; each of said application s being owned by Assignee, Metrologic Instruments, Inc., of Blackwood, N.J., and incorporated herein by reference as if fully set forth herein.

BACKGROUND OF INVENTION

1. Field of Invention

The present invention relates to retail point of sale (POS) scanning and checkout systems which enable retail cashiers to check out goods and services for purchase, while enabling customers to verify the price of products being purchased as they are being scanned, and also learn about consumer products and services offered by retailers through advertisements, productions and other forms of electronic-education delivered to consumers at a checkout counter.

2. Brief Description of The State of The Art

POS-based checkout systems of the type illustrated in FIG. 1 are well known in the art and appear to be setting standards in the retail industry, particularly in high-volume checkout applications such as supermarkets, discount stores, superstores, and the like. Such POS-based checkout systems have either a projection-type or a bioptical laser scanner mounted in the countertop between the cashier, who stands on one side of the checkout counter, and the customer, who stands on the other side thereof during checkout operations.

At the checkout system 1 shown in FIG. 1, purchase items are automatically identified by the laser scanning bar code reader 2 as the cashier moves the items in the direction towards the package area where the scanned items are bagged. Automatically the price of each scanned item is displayed on a price display monitor 3 typically located above the cash register terminal 4 in a direction facing away from the item movement direction, illustrated in FIG. 1. Conventional checkout counter arrangements of such design render it difficult for customers to visually track scanned items with their purchased price information being displayed on the price display monitor 2. Visual tracking becomes even more difficult when large checkout lines are formed and the cashier is pressured to scan purchase items at the highest speeds humanly possible. In such instances, the customer is typically resigned to accept that scanned items have been properly marked with correct price information, as price verification on the display 3 by the customer is virtually impossible if and when the slightest distraction occurs along the checkout counter. When the customer is accompanied by children, visual price verification tends to become even more difficult.

Also, conventional courtesy stands 5 which straddle POS-based projection and bioptical laser scanners 2, and provide support for ATM devices 6 and their accompanying magstripe readers 7 as shown in FIG. 1, typically occupy a great deal of valuable space at the checkout counter, and generally detract from the appearance of the checkout counter where produces are purchased and sold.

Moreover, while most price display monitors 3 above the cash register terminal are capable of displaying advertisements and promotions to the customers as they checkout their products, such monitors are not capable of performing any other functions in conventional POS-based checkout environments.

Thus, there is a great need in the art for improved POS-based bar code reading systems that are capable of satisfying the diverse requirements of modem checkout operations in physical retail environments, while avoiding the shortcomings and drawbacks of prior art POS-based systems and methodologies.

OBJECTS AND SUMMARY OF THE INVENTION

Accordingly, a primary object of the present invention is to provide a novel POS-based bar code symbol reading system having an integrated customer-kiosk terminal, and being essentially free of the shortcomings and drawbacks of prior art POS-based systems and methodologies.

Another object of the present invention is to provide a novel POS-Based Bar Code Reading System With An Integrated Customer-Kiosk Terminal is installed in the countertop surface so that (i) the cashier is capable of entering product price information into the computer-based cash register system during the check-out of weighed purchase items, while (ii) the customer is able to view the price, weight and item-identity data of scanned items on the LCD panel located on the customer side of the system.

Another object of the present invention is to provide a novel POS-Based Bar Code Reading System With An Integrated Internet-Enabled Customer-Kiosk Terminal, wherein a POS-Based Bioptical Laser Scanning Bar Code Reading Unit is integrated with a Cashier-Scale-Terminal/Customer-Kiosk-Terminal Module via a housing interconnection technique, and wherein the POS-based bioptical scanning unit supports a produce weigh tray having a recessed surface region for slidably receiving the full weight of produce items under gravitational loading so that the full weight of the produce items to be purchased is accurately measured by an electronic produce scale integrated within the bottom portion of the POS-based bioptical scanning unit.

Another object of the present invention is to provide a novel POS-Based Bar Code Reading System With An Integrated Internet-Enabled Customer-Kiosk Terminal, wherein its ATM submodule is removably detachable from a first installation port provided on the right side of the Cashier-Scale-Terminal/Customer-Kiosk-Terminal Module, and its voice-over-IP courtesy phone submodule is removably detachable from a second installation port provided on the left side of the Cashier-Scale-Terminal/Customer-Kiosk-Terminal Module.

Another object of the present invention is to provide a novel POS-Based Bar Code Reading System With An Integrated Internet-Enabled Customer-Kiosk Terminal, wherein the cashier at the POS station faces the vertical scanning window of a POS-based Bioptical Laser Scanning Bar Code Reading Unit as well as a cashier-scale-terminal (with LCD panel and membrane keyboard) provided on the cashier's side of the POS-Based Laser Scanning Bar Code Reading System, while the customer faces (i) an Internet-enabled customer-Kiosk Terminal (with LCD panel and touch-screen keyboard integrated therewith) provided on the cashier's side of the system, as well as (ii) the financial transaction terminal associated with the ATM submodule, (iii) the hand-set associated with the voice-over-IP phone module, and (iv) the courtesy desk surface disposed beneath the customer-kiosk transaction terminal.

Another object of the present invention is to provide a novel POS-Based Bar Code Reading System With An Integrated Internet-Enabled Customer-Kiosk Terminal, wherein, the display screen associated with the customer kiosk terminal is provided with an Advertisement/Promotion Mode of display operation so that it is capable of displaying advertisements and promotions (of the hosting retailer or other retailers) while the cashier is not scanning products and the price and product information thereof is being displayed during its Price/Product Information Display Mode.

Another object of the present invention is to provide a novel POS-Based Bar Code Reading System With An Integrated Internet-Enabled Customer-Kiosk Terminal, wherein such advertising and promotions can relate to the products offered for sale in the hosting retailer store, services and products offered for sale in local and/or regional markets, as well as community news, sporting events, recreational events as well as local educational programs and the like.

Another object of the present invention is to provide a novel POS-Based Bar Code Reading System With An Integrated Internet-Enabled Customer-Kiosk Terminal, comprising: a plurality of VLDs, light focusing optics, scanning motors and scanning optics for producing and scanning laser scanning beams so as to project a laser scanning pattern through the horizontal and vertical scanning windows of the system, and scan bar codes on objects being moved thereby by the cashier, and light collection optics for collecting the focusing the return laser light signal for subsequent photodetection; a plurality of laser scan data generator and processing modules including a plurality of photodetectors, for producing scan data signals, that are ultimately decode-processed in order to produce symbol character data representative of the bar code symbol scanned by the system; a microprocessor, memory architecture, system bus architecture (having different levels of buses) and an I/O interface connected to such buses for enabling the collection, processing and transport of data elements generated by the various components in the system; a cashier-scale terminal having a LCD panel, keypad and associated circuitry; a customer-transaction terminal (i.e. having a LCD panel, a keypad, a magstripe reader, and associated circuitry); Internet-enabled customer-kiosk terminal (i.e. computer subsystem) realized as a microcomputing system running an operating system (OS), networking software to support the TCP/IP protocol, Internet access software (e.g. Web browser software such as Microsoft Explorer) to access the WWW and other information resources on the Internet, and peripheral hardware and software components such as a LCD panel, touch-screen keypad mounted thereon, and a speech/voice recognition interface and a bar code symbol reader integrated with the microcomputing system; a voice-over-IP telephone handset integrated with the microcomputing system, and having software components running thereon to support its voice communication functions over the Internet, or alternatively, over a Public Telecommunications Switching Network (PTSN) in a manner known in the art; a network interface controller (NIC) card operably connected to system bus architecture, for enabling data packet communications over an packet-switched information network (e.g. Internet); an multiport Ethernet hub device connected to the NIC card and the Internet-enabled customer-kiosk terminal, so that entire POS-Based Bar Code Reading System With Internet-Enabled Customer-Kiosk Terminal has one or more Ethernet data ports for operable connection to a TCP/IP network such as a retail LAN which, in turn, is connected to the Internet.

Another object of the present invention is to provide a novel POS-Based Bar Code Reading System With An Integrated Internet-Enabled Customer-Kiosk Terminal, which comprises a POS-Based Bioptical Laser Scanning Bar Code Reading Unit integrated with a Cashier-Scale-Terminal/Customer-Kiosk-Terminal Unit and contained in a housing of generally unitary construction.

Another object of the present invention is to provide a novel POS-Based Bar Code Reading Cash Register System With An Integrated Internet-Enabled Customer-Kiosk Terminal, comprising a POS-Based Bottom-Type Bar Code Reading Unit which is integrated with a Cashier-Scale-Transaction-Terminal/Customer-Kiosk-Terminal Unit and enclosed in a scanner/kiosk housing of unitary construction.

Another object of the present invention is to provide such novel POS-Based Bar Code Reading Cash Register System, wherein an electronically-controlled cash drawer is operably associated with the system, and mountable beneath a counter surface in a manner well known in the art.

Another object of the present invention is to provide a novel POS-Based Bar Code Reading Cash Register System With An Integrated And Internet-Enabled Customer-Kiosk Terminal, comprising: a cashier transaction terminal (with a LCD panel and a membrane keyboard) provided on the cashier's side of the system; a customer-kiosk transaction terminal (with a LCD panel and a touch-screen keyboard integrated therewith) supported on a customer-transaction module on the customer's side of the system; a transaction terminal associated with an ATM submodule mounted to a first side of the scanner/kiosk housing; a hand-set associated with the voice-over-IP phone module mounted to the second side of the scanner/kiosk housing; and a courtesy desk surface disposed beneath the customer-kiosk transaction terminal.

Another object of the present invention is to provide a novel POS-Based Bar Code Reading Cash Register System With An Integrated And Internet-Enabled Customer-Kiosk Terminal, comprising: a plurality of VLDs, light focusing optics, scanning motors and scanning optics for producing and scanning laser scanning beams so as to project a laser scanning pattern through the horizontal scanning window of the system, and scan bar codes on objects being moved thereby by the cashier, and light collection optics for collecting the focusing the return laser light signal for subsequent photodetection; a plurality of laser scan data generator and processing modules including a plurality of photodetectors, for producing scan data signals, that are ultimately decode-processed in order to produce symbol character data representative of the bar code symbol scanned by the system; a microprocessor, memory architecture, system bus architecture (having different levels of buses) and an I/O interface connected to such buses for enabling the collection, processing and transport of data elements generated by the various components in the system; a cashier-scale-transaction terminal having a LCD panel, keypad and associated circuitry, for entering and processing information relating to (i) purchase items to be weighed by the electronic scale subsystem, as well as (ii) customer information enabling a consumer transaction to be transacted at the system, and enable the opening of the electronically-controlled cash drawer during the appropriate stage of the consumer transaction; a customer-transaction terminal (i.e. having a LCD panel, a keypad, a magstripe reader, and associated circuitry); Internet-enabled customer-kiosk terminal (i.e. computer subsystem) realized as a micro-computing system running an operating system (OS), networking software to support the TCP/IP protocol, Internet access software (e.g. Web browser software such as Microsoft Explorer) to access the WWW and other information resources on the Internet, and peripheral hardware and software components such as a LCD panel, touch-screen keypad mounted thereon, and a speech/voice recognition interface and a bar code symbol reader integrated with the microcomputing system; a voice-over-IP telephone handset integrated with the microcomputing system, and having software components running thereon to support its voice communication functions over the Internet, or alternatively, over a Public Telecommunications Switching Network (PTSN) in a manner known in the art; a network interface controller (NIC) card operably connected to system bus architecture, for enabling data packet communications over an packet-switched information network (e.g. Internet); an multiport Ethernet hub device connected to the NIC card and the Internet-enabled customer-kiosk terminal so that entire POS-Based Bar Code Reading System With Internet-Enabled Customer-Kiosk Terminal has one or more Ethernet data ports for operable connection to a TCP/IP network such as a retail LAN which, in turn, is connected to the Internet.

Another object of the present invention is to provide a novel POS-Based Bar Code Reading Cash Register System With An Integrated And Internet-Enabled Customer-Kiosk Terminal, wherein by virtue of its novel construction, the POS-Based Bar Code Reading Cash Register System With An Integrated Internet-Enabled Customer-Kiosk Terminal is capable of performing all of the functions enabled by prior art POS-based checkout counter systems, with the advantage that the system of the present invention does so in a system form factor having a unitary construction that occupies only a fraction of the space required by the prior art, while enabling a variety of Internet-based services that offer real value to customers as they are checking out their purchase items.

Another object of the present invention is to provide a novel POS-Based Bar Code Reading Cash Register System With An Integrated And Internet-Enabled Customer-Kiosk Terminal, wherein a POS-Based Vertical/Projection-Type Laser Scanning Bar Code Reading Unit is integrated with a Cashier-Transaction-Terminal/Customer-Kiosk-Terminal Unit which are enclosed in a housing of unitary construction.

Another object of the present invention is to provide such a novel POS-Based Bar Code Reading Cash Register System With An Integrated And Internet-Enabled Customer-Kiosk Terminal, wherein an electromagnetic-based demagnetization coil structure is contained with a thin support base plate, for demagnetizing product security tags, labels and the like during retail checkout operations.

Another object of the present invention is to provide such a novel POS-Based Bar Code Reading Cash Register System With An Integrated And Internet-Enabled Customer-Kiosk Terminal, wherein an electronically-controlled cash drawer which can be mounted beneath a counter surface, is operably associated with the system.

Another object of the present invention is to provide a novel POS-based checkout station embodying any one of the POS-based bar code reading systems disclosed herein Another object of the present invention is to provide a novel method of checking out products and produce items in a retail store environment.

Another object of the present invention is to provide a novel method of displaying product and service advertisements in physical retail store environments, while customers checkout their purchased items.

These and other objects of the present invention will become apparent hereinafter and in the Claims to Invention.

BRIEF DESCRIPTION OF THE DRAWINGS

In order to more fully understand the Objects of the Present Invention, the following Detailed Description of the Illustrative Embodiments should be read in conjunction with the accompanying Figure Drawings in which.

DETAILED DESCRIPTION OF THE ILLUSTRATIVE EMBODIMENTS OF THE PRESENT INVENTION

Figure 1:
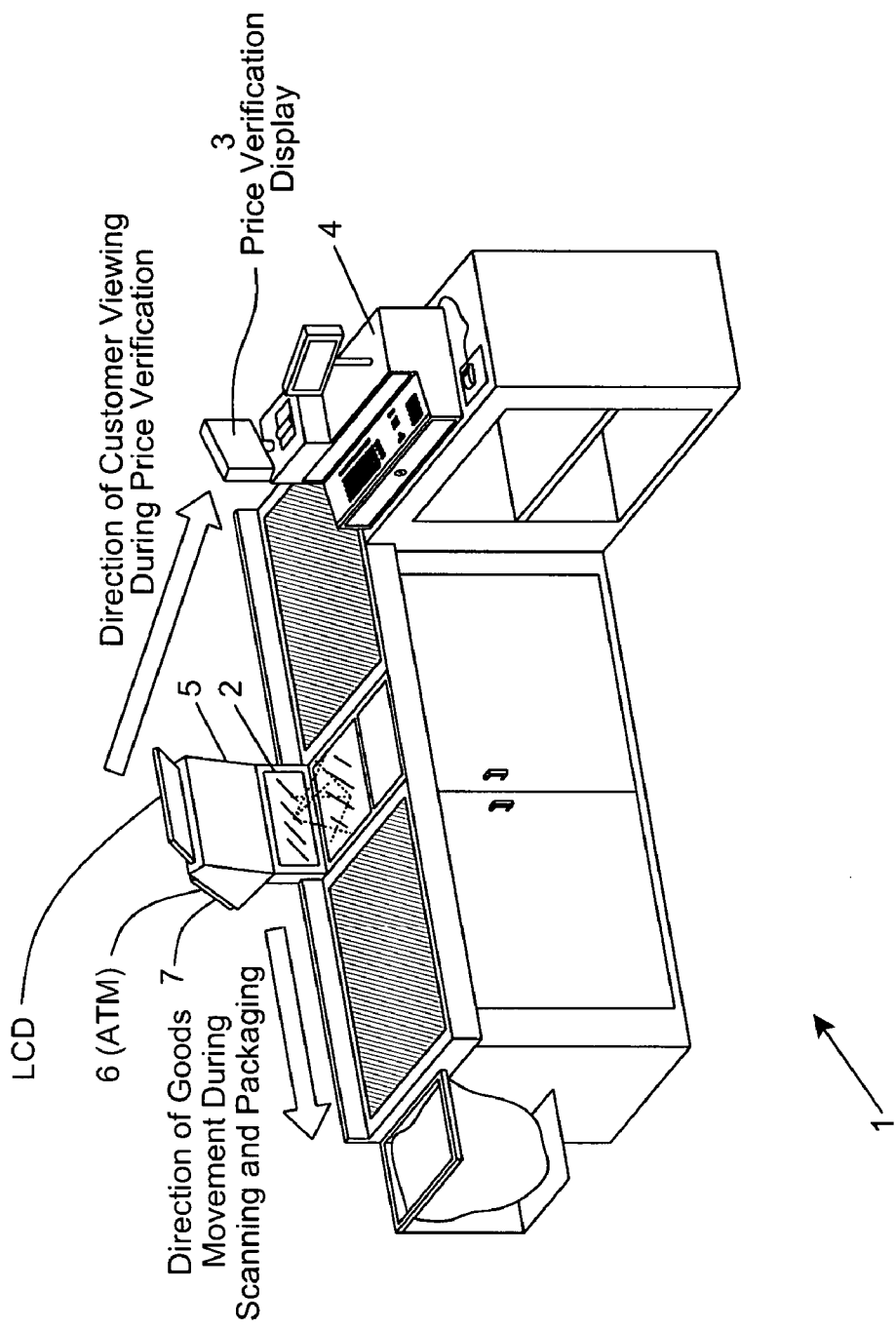
FIG. 1 is a schematic representation of a conventional (i.e. prior art) POS checkout station, wherein (i) a projection-type or bioptical-type laser-scanning bar code symbol reading system with an integrated electronic produce scale subsystem is installed within the countertop surface (e.g. between a pair of conveyor belts), (ii) a customer courtesy stand straddles the laser scanner and supports an ATM terminal on the customer side of the checkout counter, whereas a cashier scale terminal (comprising a LCD panel and keyboard) is supported on the cashier side of the counter to enable the cashier to enter (i.e. key) information into the system about products and produce items to be weighed by the electronic scale subsystem, and (iii) a computer-based cash register system having a customer-viewable price-verification and advertisement display panel which is installed on the cashier side of the check-out counter away from but interfaced with the bar code scanning system and electronic product scale subsystem.

Referring now to the figure drawings, the Objects of the Present Invention will be best understood by reading the following Detailed Description Of The Illustrative Embodiments in conjunction with the appended Drawings, wherein like structures and elements are indicated by like reference numerals.

Figure 2:
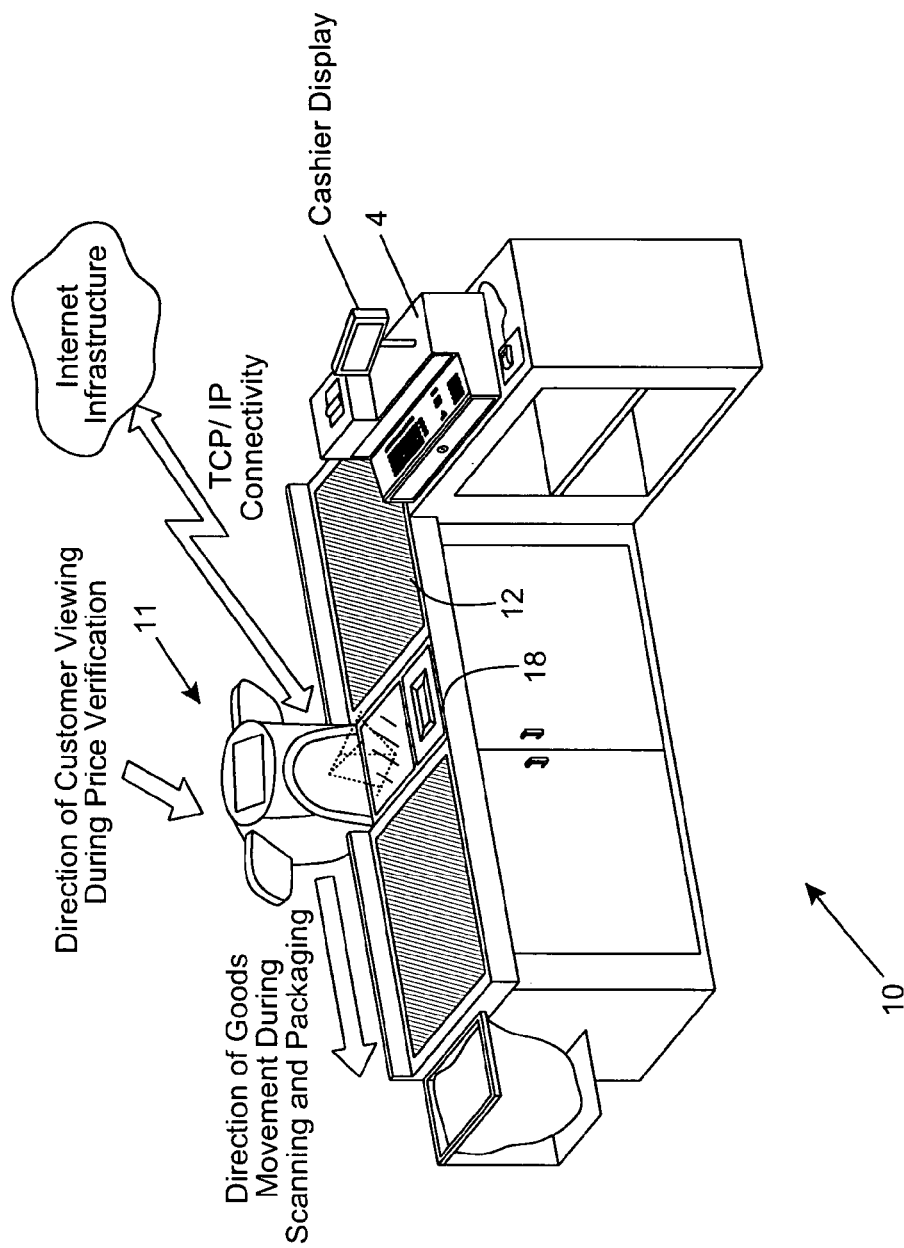
FIG. 2 is a schematic representation of a POS-based checkout station configured in accordance with the principles of the present invention, wherein a first illustrative embodiment of the POS-Based Bar Code Reading System With An Integrated Customer-Kiosk Terminal is shown installed in the countertop surface so that (i) the cashier is capable of entering product price information into the computer-based cash register system during the check-out of weighed purchase items, while (ii) the customer is able to view the price, weight and item-identity data of scanned items on the LCD panel located on the customer side of the system.

First Illustrative Embodiment of the POS-Based Laser Scanning Bar Code Reading System with an Integrated Internet-Enabled Customer-Kiosk Terminal of the Present Invention In FIG. 2, there is shown a POS-based checkout station 10 configured in accordance with the principles of the present invention. In this checkout station design, a first illustrative embodiment of the POS-Based Bar Code Reading System With Internet-Enabled Customer-Kiosk Terminal 11 is shown. This system is installed in a countertop surface 12 so that (i) the cashier is capable of entering product price information into the system 4 via a cashier-scale terminal 14 during the checking out of weighed purchase items, while (ii) the customer is able to view the product price, weight and identity information about scanned items on the LCD panel 13 located on the customer side of the system. While the first illustrative embodiment of the POS-Based Bar Code Reading System With An Integrated Internet-Enabled Customer-Kiosk Terminal 11 is shown installed within a POS-based checkout station 10, it is understood that all other embodiments of the POS-Based Bar Code Reading System of the present invention disclosed herein can be installed and used within such a retail environment with or without modification.

Figure 3A:
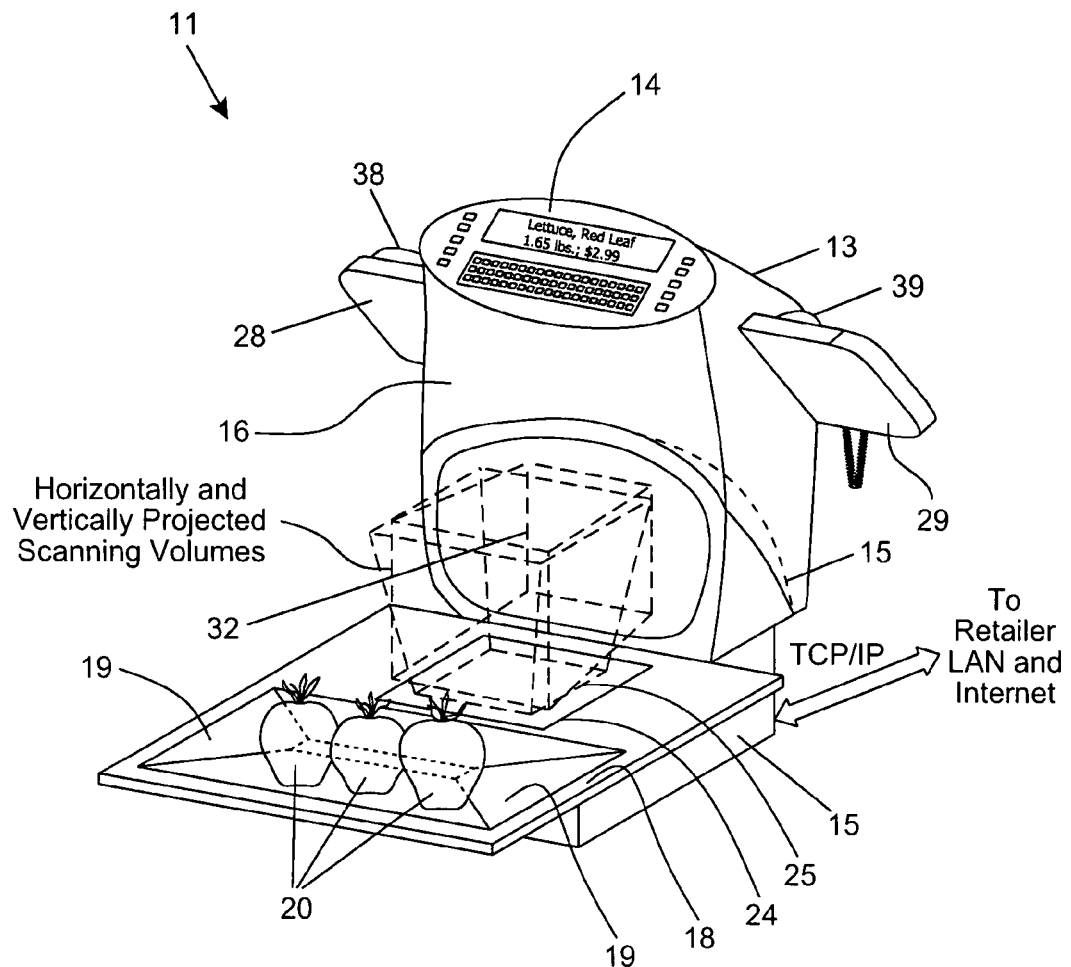
FIG. 3A is a perspective view of the first illustrative of the POS-Based Bar Code Reading System With An Integrated Internet-Enabled Customer-Kiosk Terminal, showing a POS-Based Bioptical Laser Scanning Bar Code Reading Unit integrated with a Cashier-Scale-Terminal/Customer-Kiosk-Terminal Module via a housing interconnection technique, wherein the POS-based bioptical scanning unit supports a produce weigh tray having a recessed surface region for slidably receiving the full weight of produce items under gravitational loading so that the full weight of the produce items to be purchased is accurately measured by an electronic produce scale integrated within the bottom portion of the POS-based bioptical scanning unit.
Figure 4A:
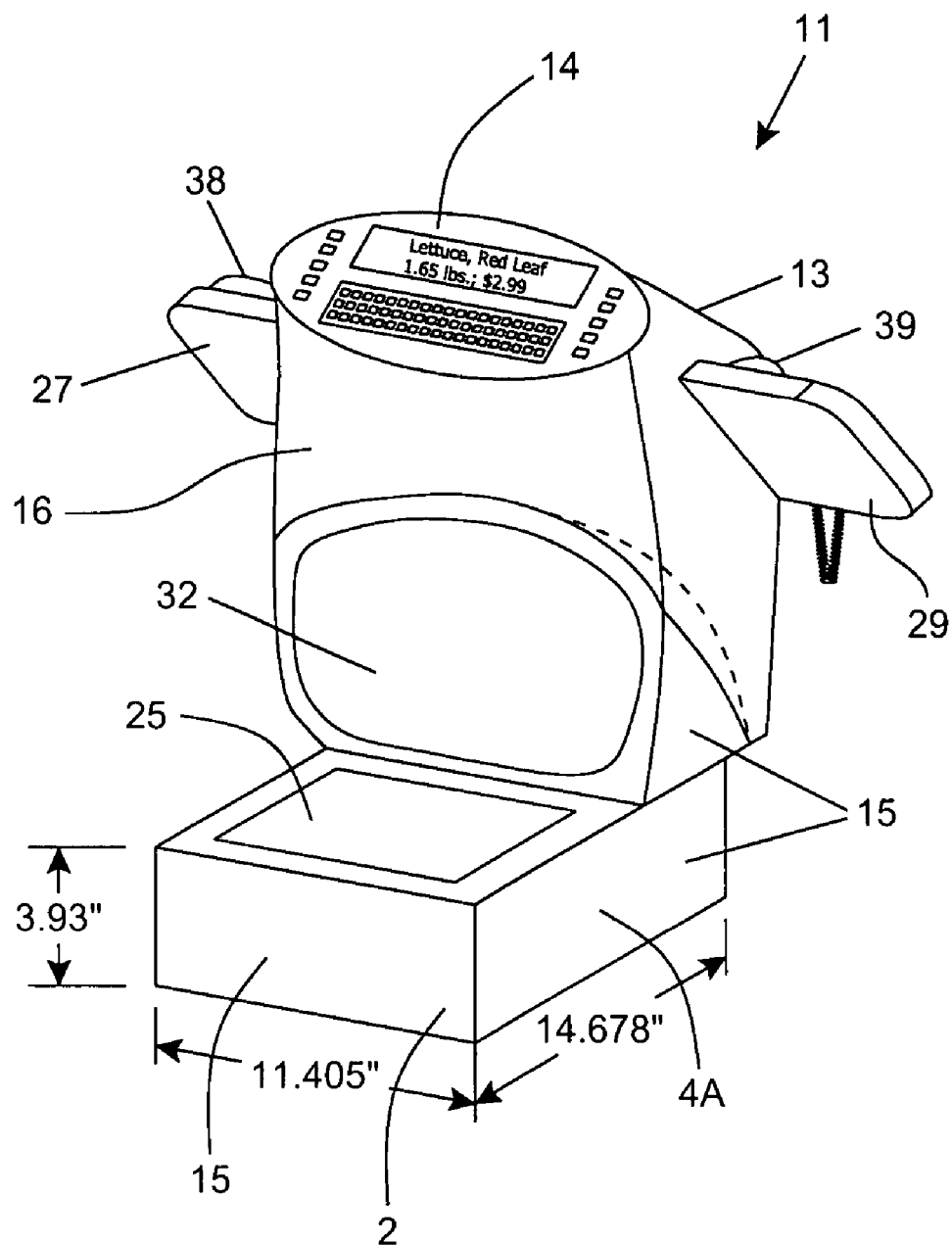
FIG. 4A is a perspective view of the first illustrative embodiment of the POS-Based Bar Code Reading System With An Integrated Internet-Enabled Customer-Kiosk System Terminal in FIGS. 3A and 3B, wherein the Produce Weigh Tray thereof is shown removed from the electronic produce scale integrated therewith.
Figure 4B:
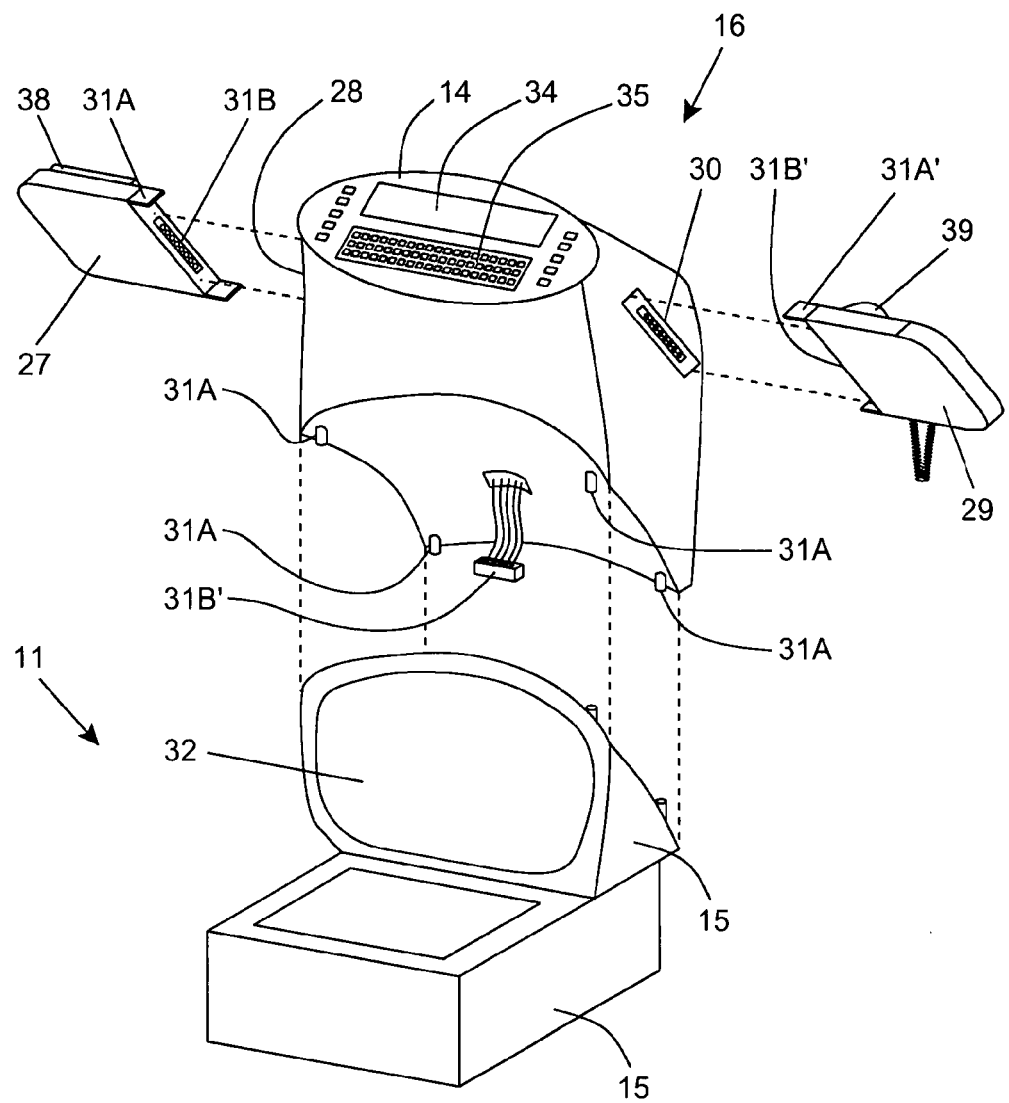
FIG. 4B is a partially exploded diagram of the POS-Based Bar Code Reading System With An Integrated Internet-Enabled Customer-Kiosk Terminal illustrated in FIG. 4A, showing the Cashier-Scale-Terminal/Customer-Kiosk-Terminal Module removably detached from its POS-Based Bioptical Laser Scanning Bar Code Reading Unit, and its ATM submodule removably detached from a first installation port provided on the right side of the Cashier-Scale-Terminal/Customer-Kiosk-Terminal Module and its voice-over-IP courtesy phone submodule removably detached from a second installation port provided on the left side of the Cashier-Scale-Terminal/Customer-Kiosk-Terminal Module.

As shown in FIG. 3A, POS-Based Bar Code Reading System With An Integrated Internet-Enabled Customer-Kiosk Terminal 11 comprises a POS-Based Bioptical Laser Scanning Bar Code Reading Unit 15 integrated with a Cashier-Scale-Terminal/Customer-Kiosk-Terminal Module 16 using housing interconnection techniques shown in FIG. 4B. The POS-Based Bioptical Laser Scanning Bar Code Reading Unit 15 can be realized using any of the products taught in copending application Ser. No. 09/990,585 filed Nov. 21, 2001; Ser. No. 09/999,687 filed Oct. 31, 2001; Ser. No. 09/954,477 filed Sep. 17, 2001; and Ser. No. 09/551,887 filed Apr. 18, 2000; each incorporated herein by reference.

Figure 3B:
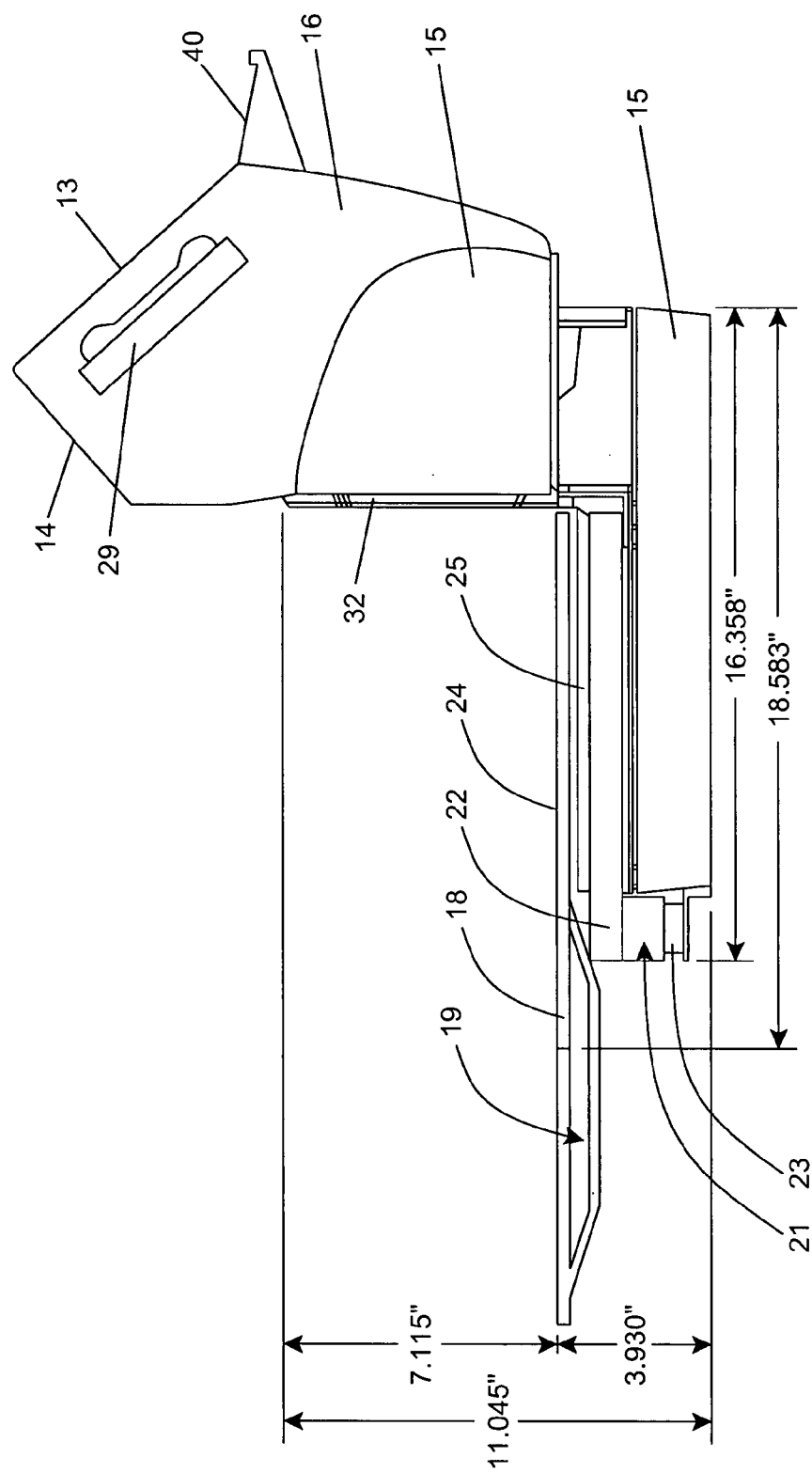
FIG. 3B is an elevated side view of the POS-Based Bar Code Reading System With An Integrated Internet-Enabled Customer-Kiosk Terminal illustrated in FIGS. 3A and 3B, showing that the produce weigh tray of the present invention is supported upon an insert resting upon the transducers of the electronic produce scale unit integrated into the system, and the surface recess formed within the produce weigh tray extends below the planar top surface of the scanning window aperture formed therein above the bottom scanning window of the POS-based bioptical laser scanning unit.

As shown in FIG. 3B, the POS-based Bioptical Laser Scanning Bar Code Reading Unit 16 supports a novel produce weigh tray 18 having a recessed surface region 19 for slidably receiving the full weight of produce items 20 under the natural forces of gravitational loading so that the full weight of the produce items to be purchased is accurately measured by an electronic produce scale subsystem 21 integrated within the bottom portion of the POS-based bioptical scanning unit 16. As shown in FIG. 3B, the produce weigh tray 18 is supported upon an insert 22 resting upon the transducers 23 associated with the electronic produce scale subsystem 21. The surface recess 19 formed within the produce weigh tray 18 extends below the planar top surface of the scanning window aperture 24 formed therein above the bottom scanning window 25 provided in the POS-based bioptical laser scanning unit 16. By virtue of this novel weigh tray design, retailers can be assured that they will recover the full cost of produce and other items requiring weighing prior to the computation of the purchase price (i.e. all produce items will fall into the tray recess 19 and be accurately weighed). Also, the tray design of the present invention prevents accidental slippage of the spherical shaped produce items onto the floor surface which might cause damage to the produce and render such items unsuitable for sale, or at substantially reduced purchase price.

In FIGS. 4A and 4B, the produce weigh tray 18 is shown removed from the electronic produce scale subsystem 21. As shown in FIG. 4B, the POS-Based Bar Code Reading System With An Integrated Internet-Enabled Customer-Kiosk Terminal 11 comprises: a Cashier-Scale-Terminal/Customer-Kiosk-Terminal Module 16 removably detachable from POS-Based Bioptical Laser Scanning Bar Code Reading Unit 16; an ATM submodule 27 removably detachable from a first installation port 28 provided on the right side of the Cashier-Scale-Terminal/Customer-Kiosk-Terminal Module 16; and a voice-over-IP courtesy phone submodule 29 removably detached from a second installation port 30 provided on the left side of the Cashier-Scale-Terminal/Internet-Enabled Customer-Kiosk-Terminal Module 16. Each module is provided with releasable mechanical connectors 31A', 31B' that enable the device to connect to a mating surface shown, and electrical connectors 31A, 31B' that can be releasably joined to establish necessary and sufficient electrical connections between the component parts of the system. The advantage of this modular design is that the retailer can build a system that meets the requirements of its customers, and possibly start out with a basic system structure and expand as necessary by adding modules 16, 27 and 29.

Figure 5:
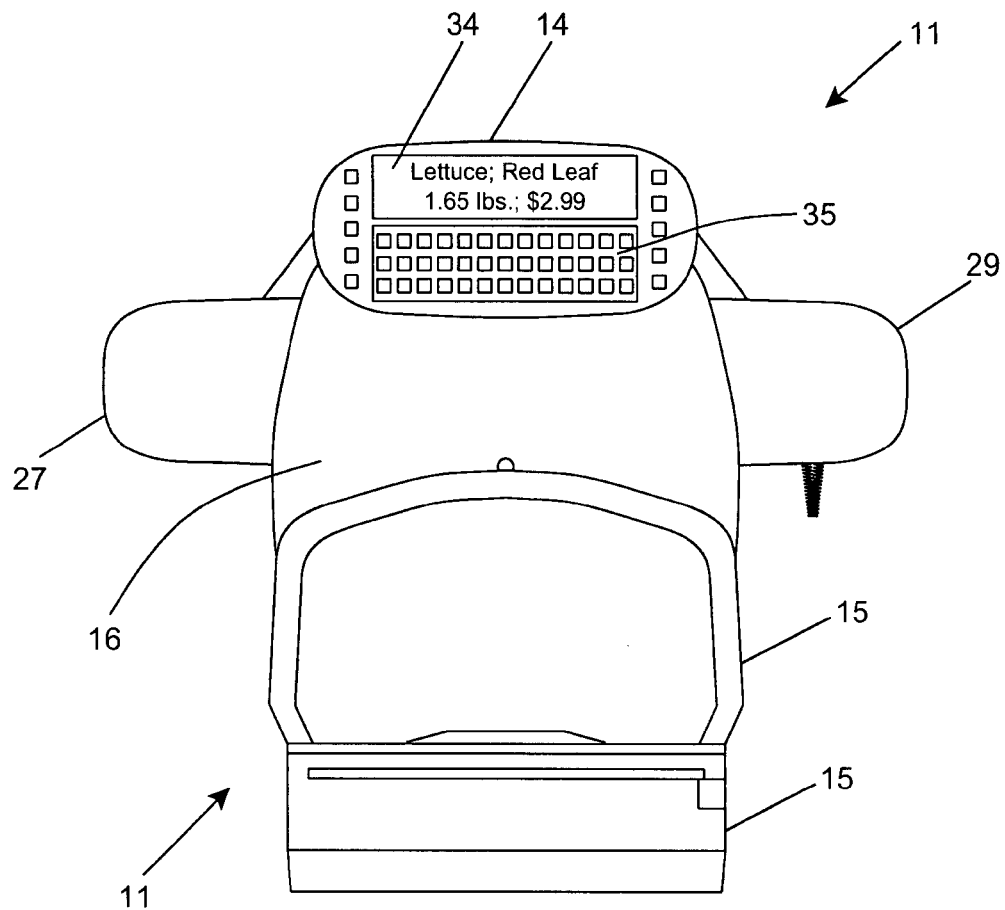
FIG. 5 is an elevated rear view of the POS-Based Bar Code Reading System With An Integrated Internet-Enabled Customer-Kiosk Terminal illustrated in FIGS. 3A through 4B, showing the vertical scanning window of the POS-based Bioptical Laser Scanning Bar Code Reading Unit and the cashier checkout terminal (with LCD panel and membrane keyboard) provided on the cashier's side of the system.

As shown in FIG. 5, the cashier at the POS station faces the vertical scanning window 32 of the POS-based Bioptical Laser Scanning Bar Code Reading Unit 15 as well as the cashier-scale terminal 14 (with LCD panel 34 and membrane keyboard 35) provided on the cashier's side of the POS-Based Laser Scanning Bar Code Reading System With An Integrated Internet-Enabled Customer-Kiosk Terminal 11.

Figure 6:
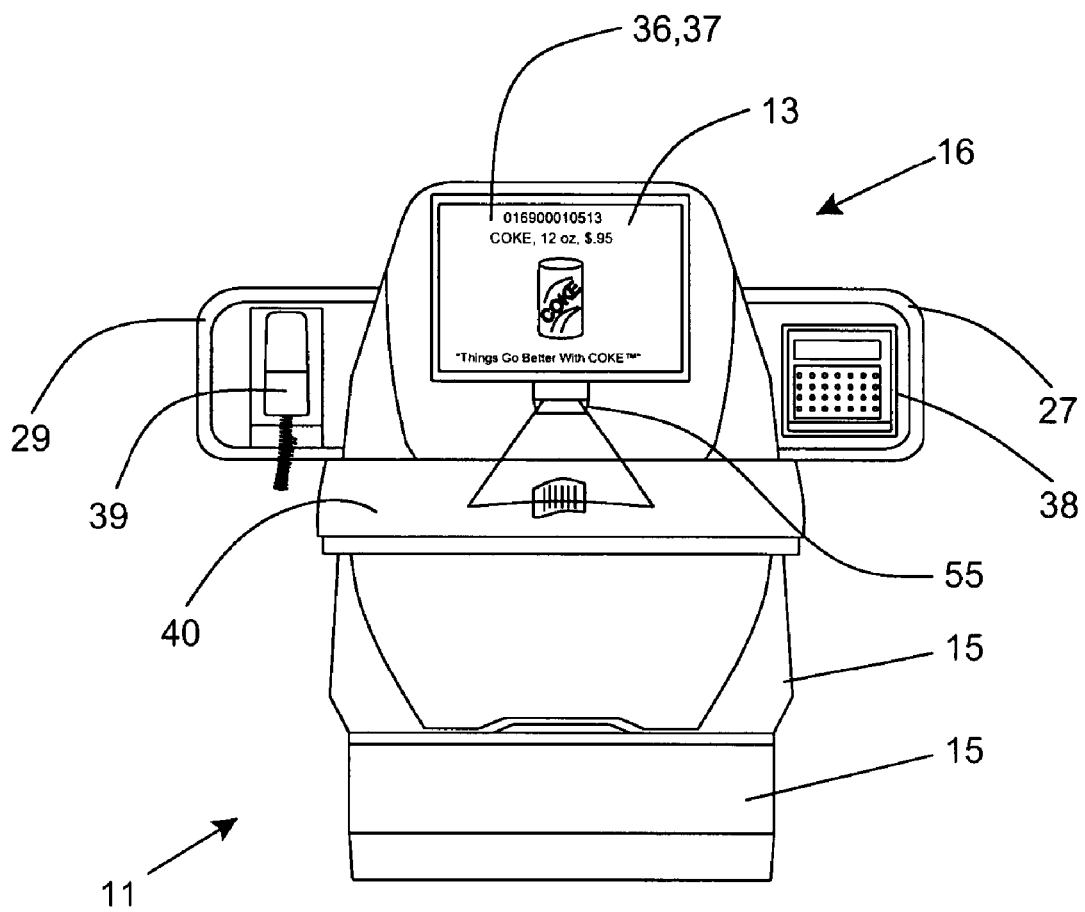
FIG. 6 is an elevated front view of the POS-Based Bar Code Reading With An Integrated Internet-Enabled Customer-Kiosk Terminal illustrated in FIGS. 3A through 4B, showing (i) the Internet-enabled Customer Kiosk Terminal (with LCD panel and touch-screen keyboard integrated therewith) provided on the cashier's side of the system, (ii) the transaction terminal associated with the ATM submodule, (iii) the hand-set associated with the voice-over-IP phone module, and (iv) the courtesy desk surface disposed beneath the customer-kiosk transaction terminal.

As shown in FIG. 6, the customer at the POS station faces (i) the Internet-enabled customer-Kiosk Terminal 13 (with LCD panel 36 and touch-screen keyboard 37 integrated therewith) provided on the cashier's side of the system, as well as (ii) the financial transaction terminal 38 associated with the ATM submodule 27, (iii) the hand-set 39 associated with the voice-over-IP phone module 29, and (iv) the courtesy desk surface 40 disposed beneath the customer-kiosk transaction terminal 13. Preferably, Internet-enabled kiosk terminal (computer subsystem) 13 is provided with an Advertisement/Promotion Mode of display operation so that it is capable of displaying advertisements and promotions (of the hosting retailer or other retailers) on display 36, 37 while the cashier is not scanning products and the price and product information thereof is not being displayed during its Price/Product Information Display Mode. The enabling infrastructure for enabling the creation and delivery of such product/service advertisements and promotions on the Internet-enabled customer kiosk terminal 13 is taught in great detail in published WIPO Publication No. WO 01/37540 A2 by IPF, Inc., incorporated herein by reference. Such advertising and promotions can relate to the products offered for sale in the hosting retailer store, services and products offered for sale in local and/or regional markets, as well as community news, sporting events, recreational events as well as local educational programs and the like.

Figure 7A:
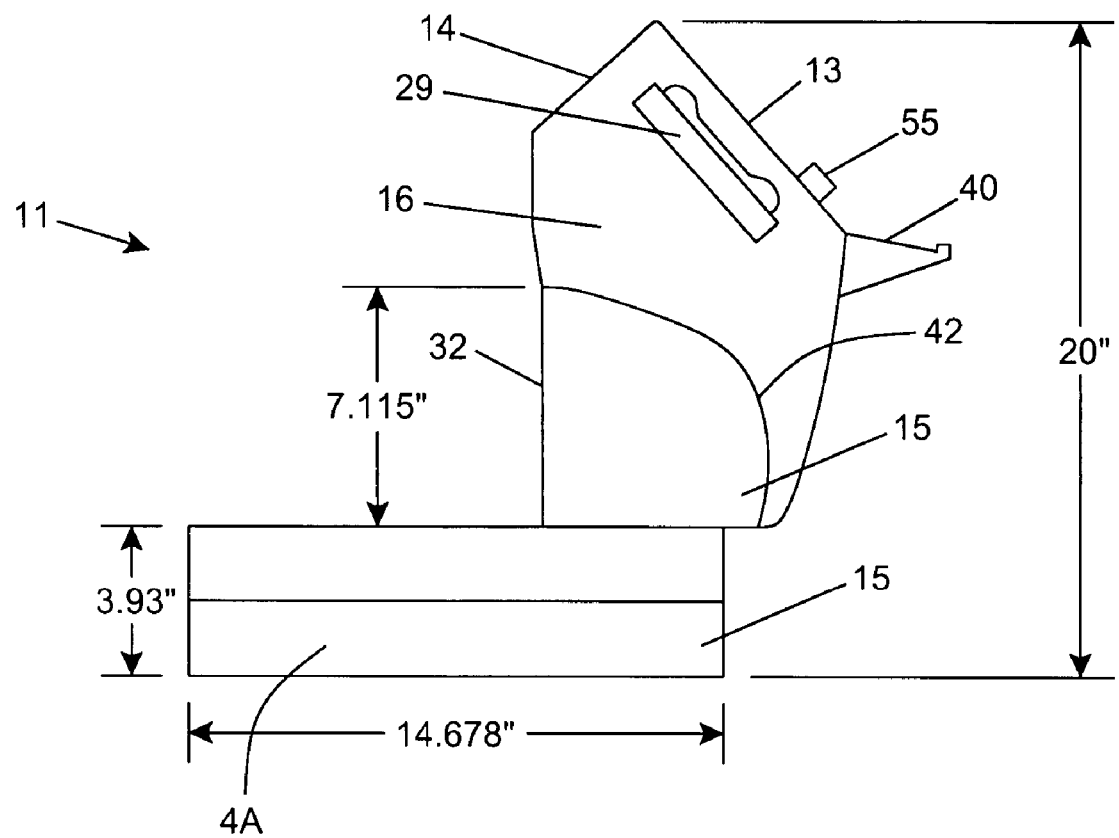
FIG. 7A is an elevated first side view of the POS-Based Bar Code Reading System With Integrated Internet-Enabled Customer-Kiosk Terminal illustrated in FIGS. 3A through 4B.
Figure 7B:
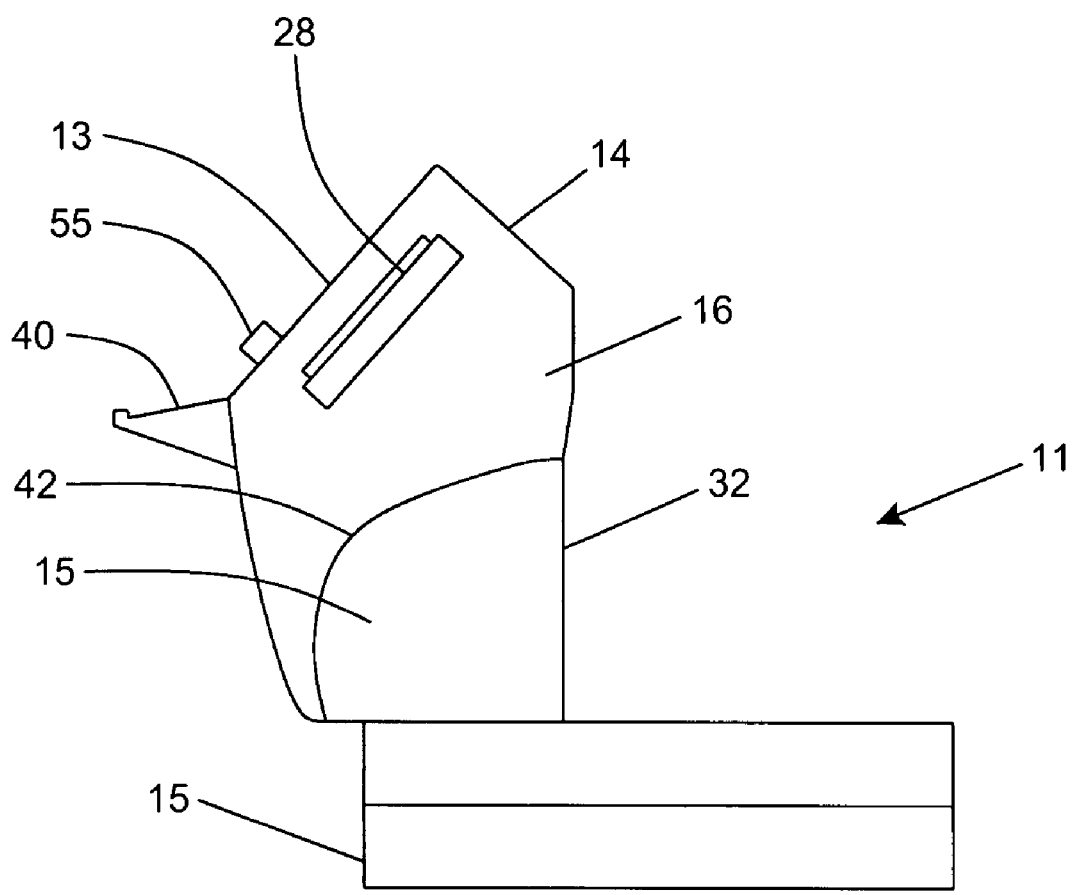
FIG. 7B is an elevated second side view of the POS-Based Bar Code Reading With An Integrated Internet-Enabled Customer-Kiosk Terminal illustrated in FIGS. 3A through 4B.

Side views of the POS-Based Bar Code Reading System With An Integrated Internet-Enabled Customer-Kiosk Terminal 11 are shown in FIGS. 7A and 7B, and illustrate that the Cashier-Scale-Terminal/Customer-Kiosk-Terminal Module 16 and the POS-Based Bioptical Laser Scanning Bar Code Reading Unit 15 are contained within separate housings yet interconnected at physical interface-boundary line 42.

Figure 8:
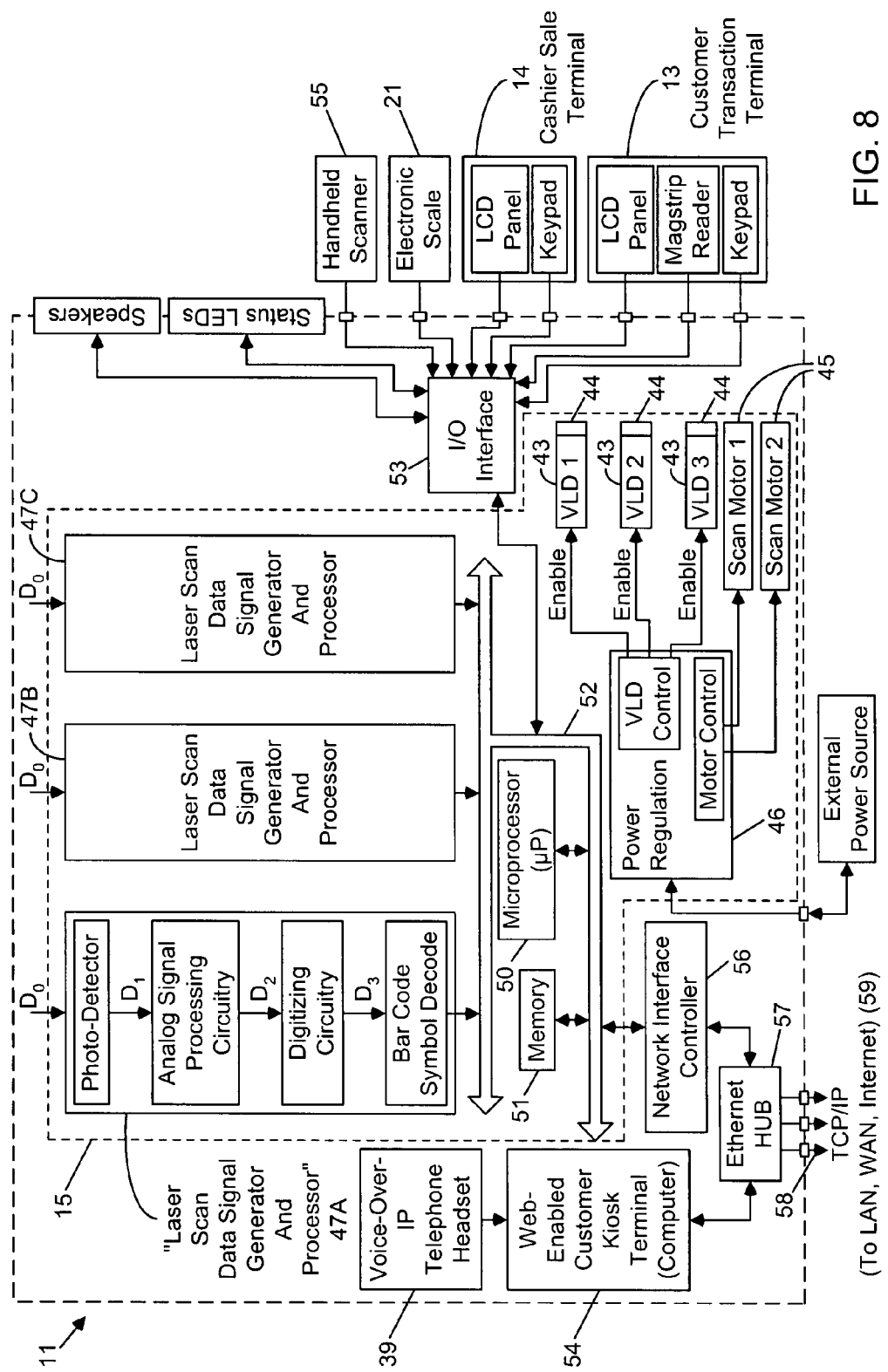
FIG. 8 is a block-schematic representation of the system diagram of the POS-Based Bar Code Reading With An Integrated Internet-Enabled Customer-Kiosk Terminal shown in FIGS. 2 through 7B.

In FIG. 8, a system diagram is provided for the POS-Based Bar Code Reading System With An Integrated Internet-Enabled Customer-Kiosk Terminal 11 illustrated in FIGS. 2 through 7B. As shown, the system comprises: a plurality of VLDs 43, light focusing optics 44, scanning motors 45 power regulation circuitry 46, and scanning optics for producing and scanning laser scanning beams so as to project a laser scanning pattern through the horizontal and vertical scanning windows of the system, and scan bar codes on objects being moved thereby by the cashier, and light collection optics for collecting the focusing the return laser light signal for subsequent photodetection; a plurality of laser scan data generator and processing modules 47A, 47B and 47C, including a plurality of photodetectors, for producing scan data signals D0 through D3, that are ultimately decode-processed in order to produce symbol character data representative of the bar code symbol scanned by the system; a microprocessor 50, memory architecture 51, system bus architecture (having different levels of buses) 52 and an I/O interface 53 connected to such buses for enabling the collection, processing and transport of data elements generated by the various components in the system; cashier-scale terminal 14 having a LCD panel, keypad and associated circuitry; customer-transaction terminal 15 (i.e. having a LCD panel, a keypad, a magstripe reader, and associated circuitry); Internet-enabled customer-kiosk terminal (i.e. computer subsystem) 54 realized as a microcomputing system running an operating system (OS), networking software to support the TCP/IP protocol, Internet access software (e.g. Web browser software such as Microsoft Explorer) to access the WWW and other information resources on the Internet, and peripheral hardware and software components such as a LCD panel 36, and touch-screen keypad 37 mounted thereon (for using customer-transaction terminal 13), and a speech/voice recognition interface and a bar code symbol reader 55 integrated with the microcomputing system; a voice-over-IP telephone handset 39 integrated with the microcomputing system, and having software components running thereon to support its voice communication functions over the Internet, or alternatively, over a Public Telecommunications Switching Network (PTSN) in a manner known in the art; a network interface controller (NIC) card 56 operably connected to system bus architecture 52, for enabling data packet communications over an packet-switched information network (e.g. Internet); an multiport Ethernet hub device 57 connected to the NIC card 56 and the Internet-enabled customer-kiosk terminal 54, so that entire POS-Based Bar Code Reading System With Internet-Enabled Customer-Kiosk Terminal 11 has one or more Ethernet data ports 58 for operable connection to a TCP/IP network 59 such as a retail LAN which, in turn, is connected to the Internet.

Figure 9:
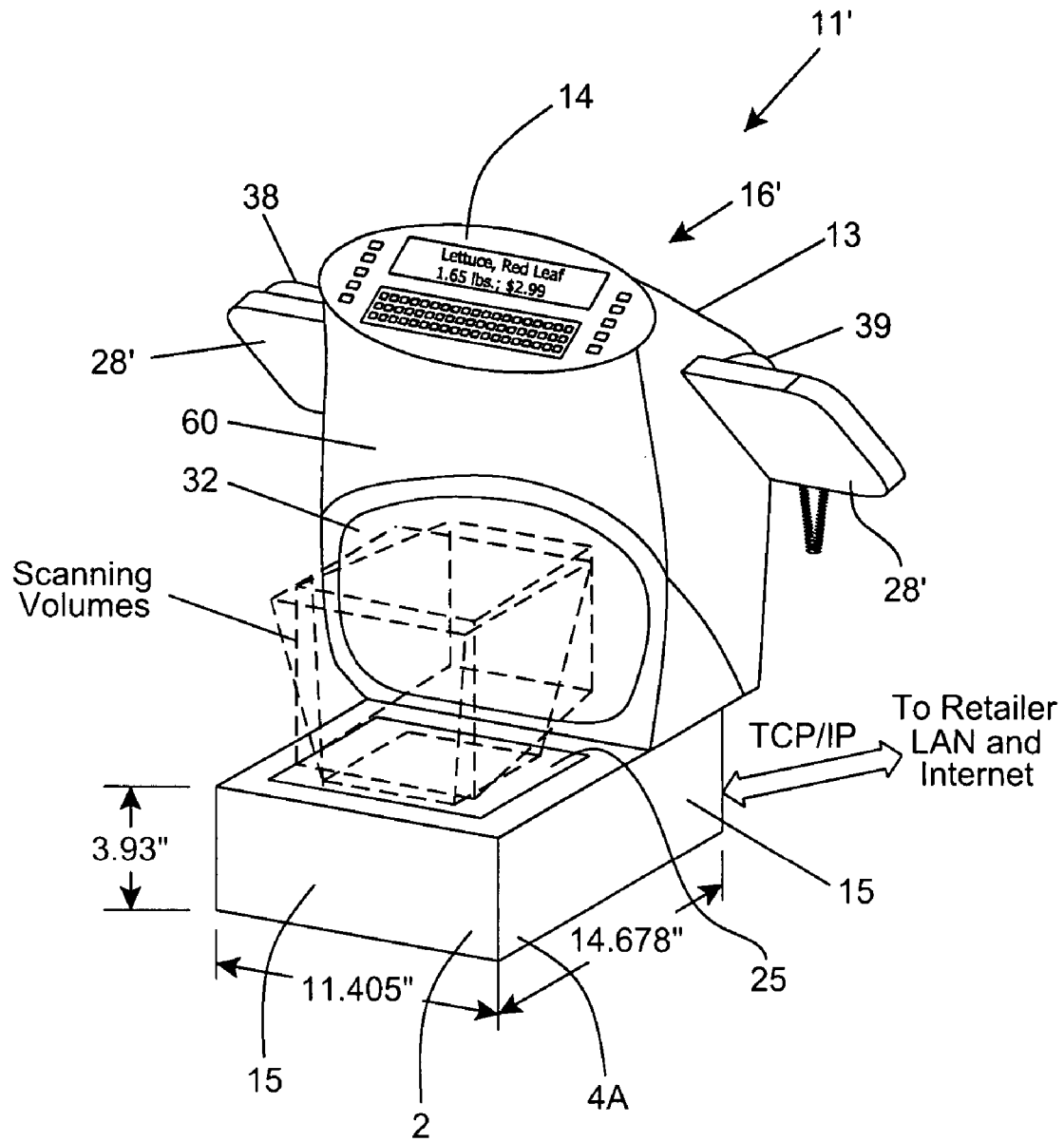
FIG. 9 is the second illustrative of the POS-Based Bar Code Reading System With Internet-Enabled Customer-Kiosk Terminal of the present invention, wherein a POS-Based Bioptical Laser Scanning Bar Code Reading Unit is integrated with a Cashier-Scale-Terminal/Customer-Kiosk-Terminal Unit in a housing of unitary construction.

Second Illustrative Embodiment of the POS-Based Bar Code Reading System with Internet-Enabled Customer-Kiosk Terminal of the Present Invention In FIG. 9, there is illustrated the second illustrative of the POS-Based Laser Scanning Bar Code Reading System With An Integrated Internet-Enabled Customer-Kiosk Terminal 11 of the present invention. As shown in FIG. 9, POS-Based Bar Code Reading System With An Integrated Internet-Enabled Customer-Kiosk Terminal 11 comprises a POS-Based Bioptical Laser Scanning Bar Code Reading Unit 15 integrated with a Cashier-Scale-Terminal/Customer-Kiosk-Terminal Unit 16' but in this design, Units 15 and 16' are both and contained in a compact housing 60 of generally unitary construction, as shown. The POS-Based Bioptical Laser Scanning Bar Code Reading Unit 15 can be realized using any of the products taught in copending application Ser. No. 09/990, 585 filed Nov. 21, 2001; Ser. No. 09/999,687 filed Oct. 31, 2001; Ser. No. 09/954,477 filed Sep. 17, 2001; and Ser. No. 09/551,887 entitled "Bioptical Holographic Laser Scanning System" filed Apr. 18, 2000; each incorporated herein by reference. While not shown, the POS-based Bioptical Bar Code Reading Unit 15 also supports the novel produce weigh tray structure 18 described in detail above, and therefore, enjoys all of the benefits thereof.

As shown in FIG. 9, the POS-Based Bar Code Reading System With An Integrated Internet-Enabled Customer-Kiosk Terminal 11' further comprises: an ATM submodule 28' provided on the right side of the Cashier-Scale-Terminal/Customer-Kiosk-Terminal Unit 16'; and a voice-over-IP courtesy phone submodule 29' provided on the left side of the Cashier-Scale-Terminal/Internet-Enabled Customer-Kiosk-Terminal Module 16'. Each module 28', 29' is permanently mounted to its central kiosk housing 60 as shown using physical and electrical connectors that establish necessary mechanical and electrical connections required between the component parts of the system.

Figure 10:
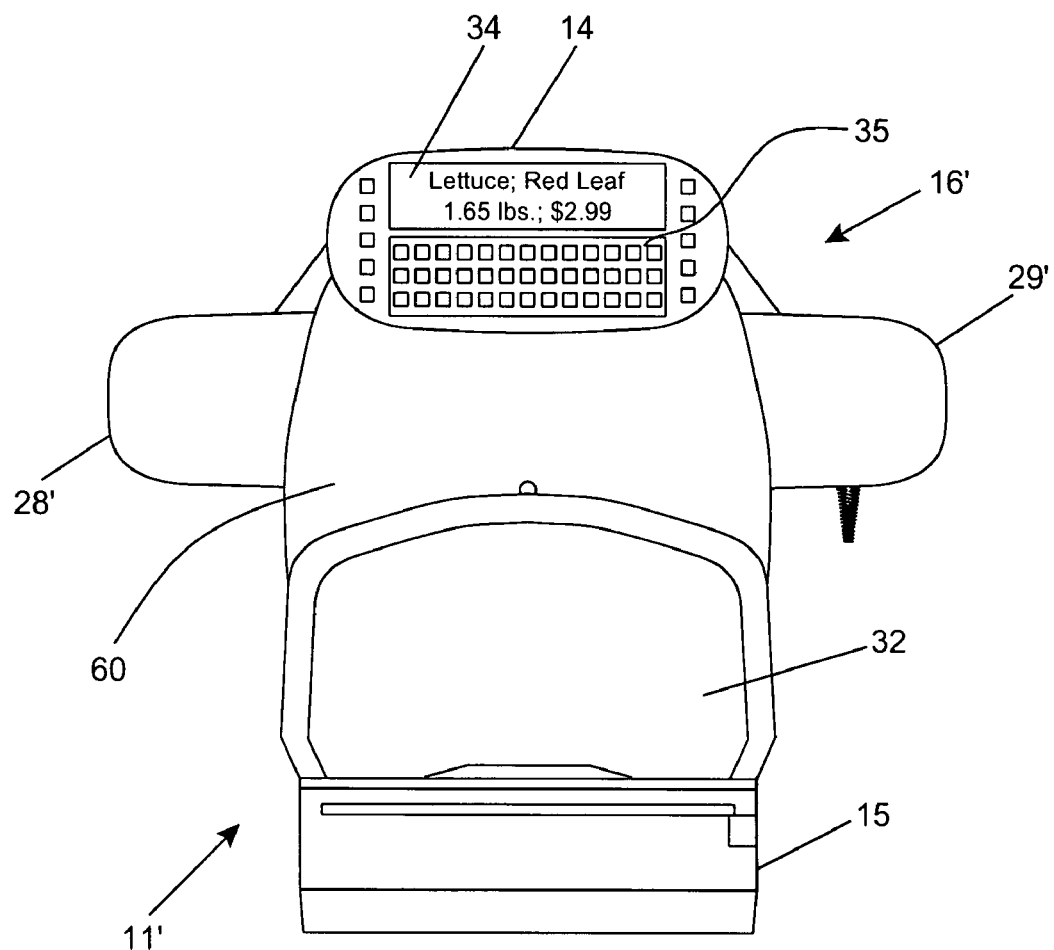
FIG. 10 is an elevated rear view of the POS-Based Bar Code Reading System With An Integrated Internet-Enabled Customer-Kiosk Terminal illustrated in FIG. 9, showing the vertical scanning window of the POS-based Bioptical Laser Scanning Bar Code Reading Unit and the cashier scale terminal (with LCD panel and membrane keyboard) provided on the cashier's side of the system.

As shown in FIG. 10, the cashier at the POS station faces the vertical scanning window 32 of the POS-based Bioptical Bar Code Reading Unit 15 as well as the cashier-scale-terminal 14 (with LCD panel 34 and membrane keyboard 35) provided on the cashier's side of the POS-Based Bar Code Reading System With An Integrated Internet-Enabled Customer-Kiosk Terminal 11'.

Figure 11:
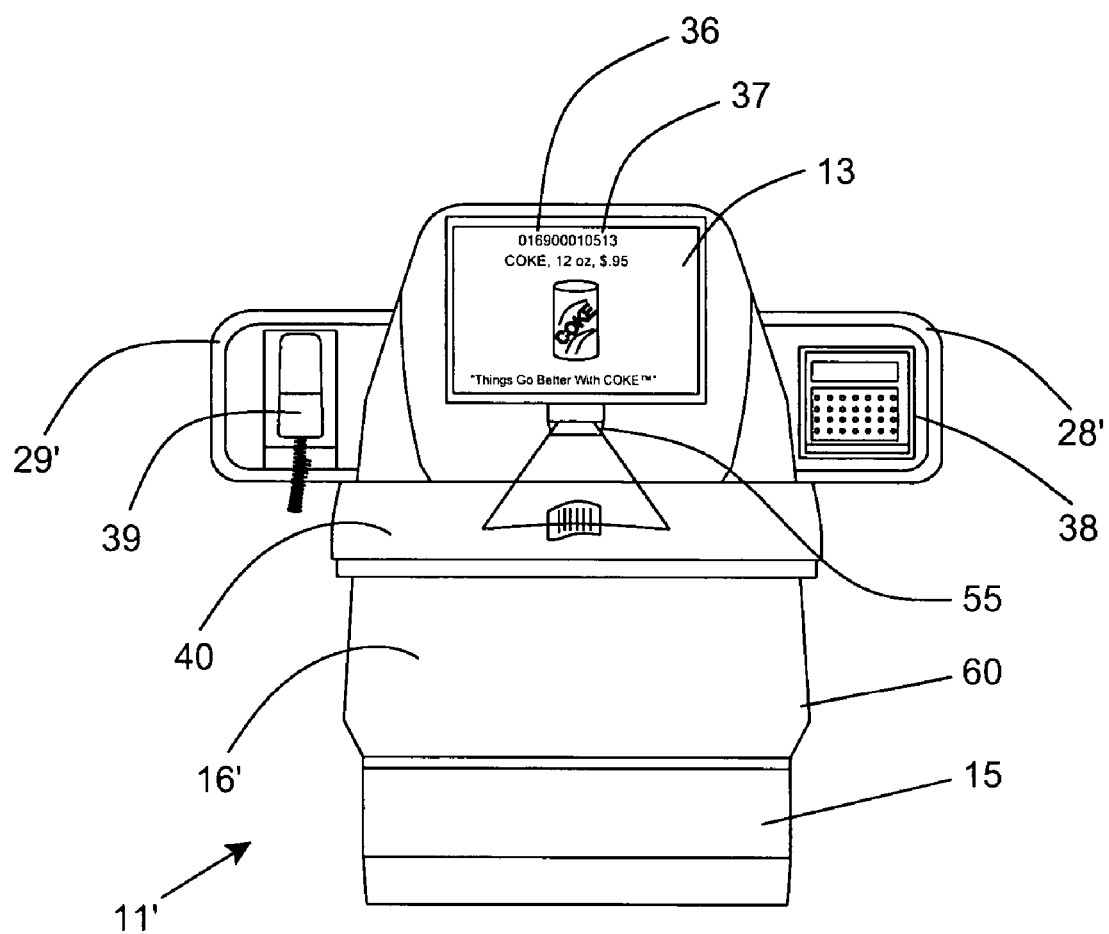
FIG. 11 is an elevated front view of the POS-Based Bar Code Reading System With An Integrated Internet-Enabled Customer-Kiosk Terminal illustrated in FIG. 9, showing (i) the customer-kiosk transaction terminal (with LCD panel and touch-screen keyboard integrated therewith) provided on the customer's side of the system, (ii) the transaction terminal associated with the ATM submodule, (iii) the hand-set associated with the voice-over-IP phone module, and (iv) the courtesy desk surface disposed beneath the customer-kiosk transaction terminal.

As shown in FIG. 11, the customer at the POS station faces (i) the Internet-enabled Customer-Kiosk-Terminal 13 (with LCD panel 36 and touch-screen keyboard 37 integrated therewith) provided on the cashier's side of the system, as well as (ii) the financial transaction terminal 38 associated with the ATM submodule 28', (iii) the hand-set 39 associated with the voice-over-IP phone module 29', and (iv) the courtesy desk surface 40 disposed beneath the customer-kiosk transaction terminal 13. Preferably, the display screen 36 is provided with an Advertisement/Promotion Mode of display operation so that it is capable of displaying advertisements and promotions (of the hosting retailer or other retailers) while the cashier is not scanning products and the price and product information thereof is being displayed during its Price/Product Information Display Mode. The enabling infrastructure for enabling the creation and delivery of such product/service advertisements and promotions on the Internet-enabled customer kiosk terminal 13 is taught in great detail in published WIPO Publication No. WO 01/37540 A2 by IPF, Inc., supra, incorporated herein by reference. Notably, such advertising and promotions can relate to the products offered for sale in the hosting retailer store, services and products offered for sale in local and/or regional markets, as well as community news, sporting events, recreational events as well as local educational programs and the like.

Figure 12A:
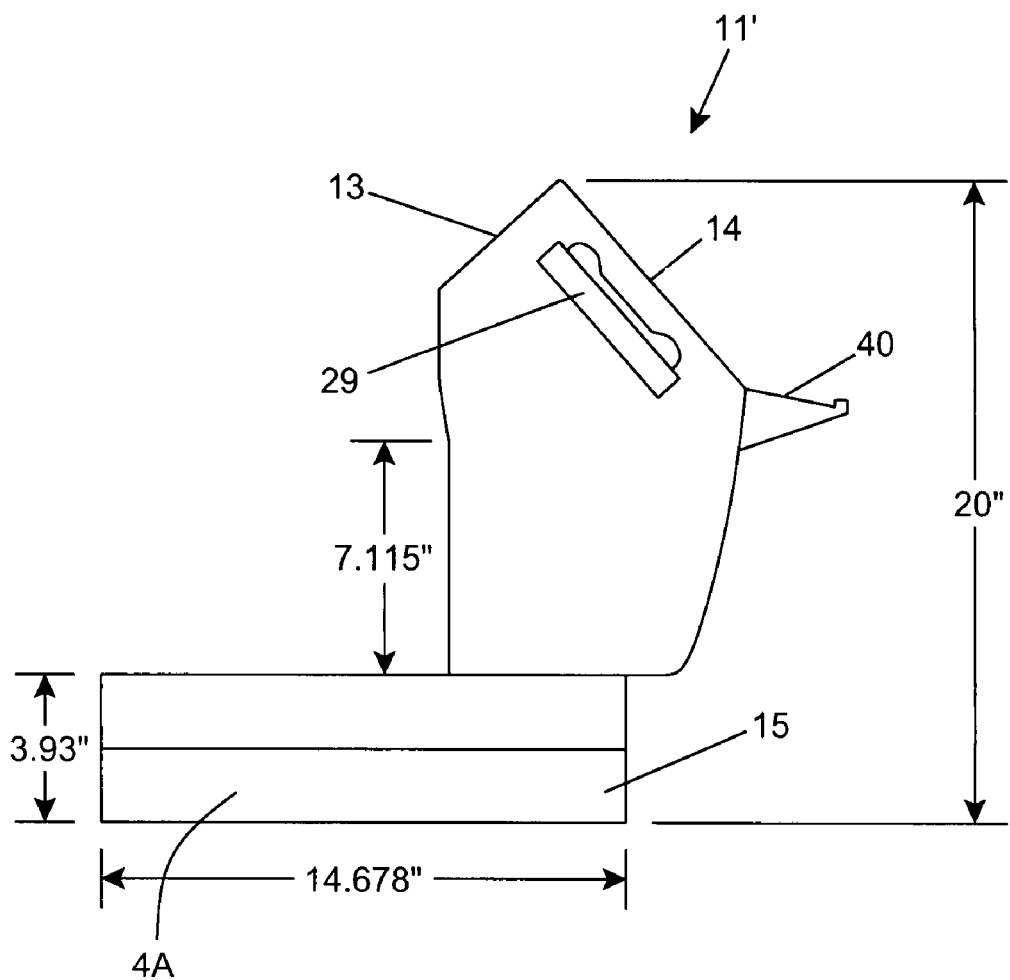
FIG. 12A is an elevated first side view of the POS-Based Bar Code Reading With An Integrated Internet-Enabled Customer-Kiosk Terminal illustrated in FIG. 9.
Figure 12B:
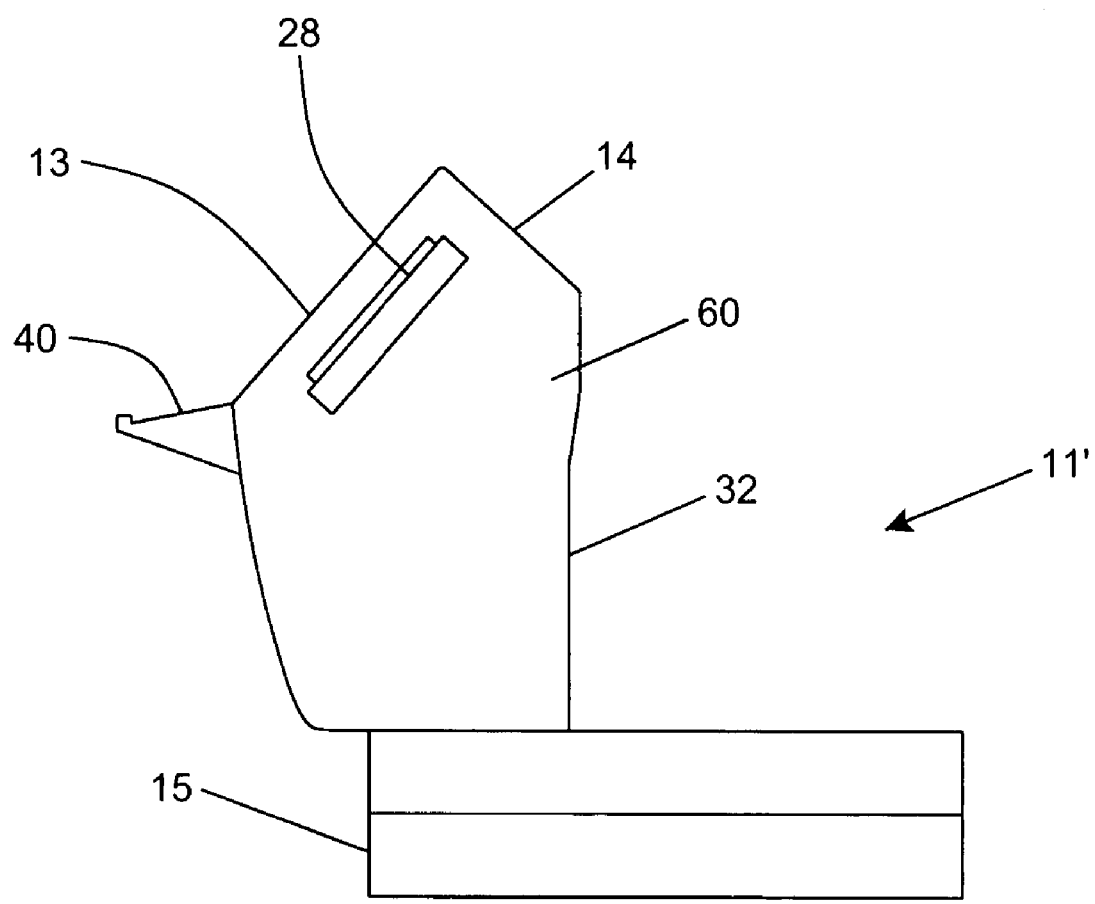
FIG. 12B is an elevated second side view of the POS-Based Laser Scanning Bar Code Reading With An Integrated Internet-Enabled Customer-Kiosk Terminal illustrated in FIG. 9.

Side views of the POS-Based Laser Scanning Bar Code Reading System With An Integrated Internet-Enabled Customer-Kiosk Terminal 11' are shown in FIGS. 12A and 12B, and illustrate that the Cashier-Scale-Terminal/Customer-Kiosk-Terminal Unit 16' and the POS-Based Bioptical Laser Scanning Bar Code Reading Unit 15 are contained in housing 60 having a generally unitary construction.

Figure 13:
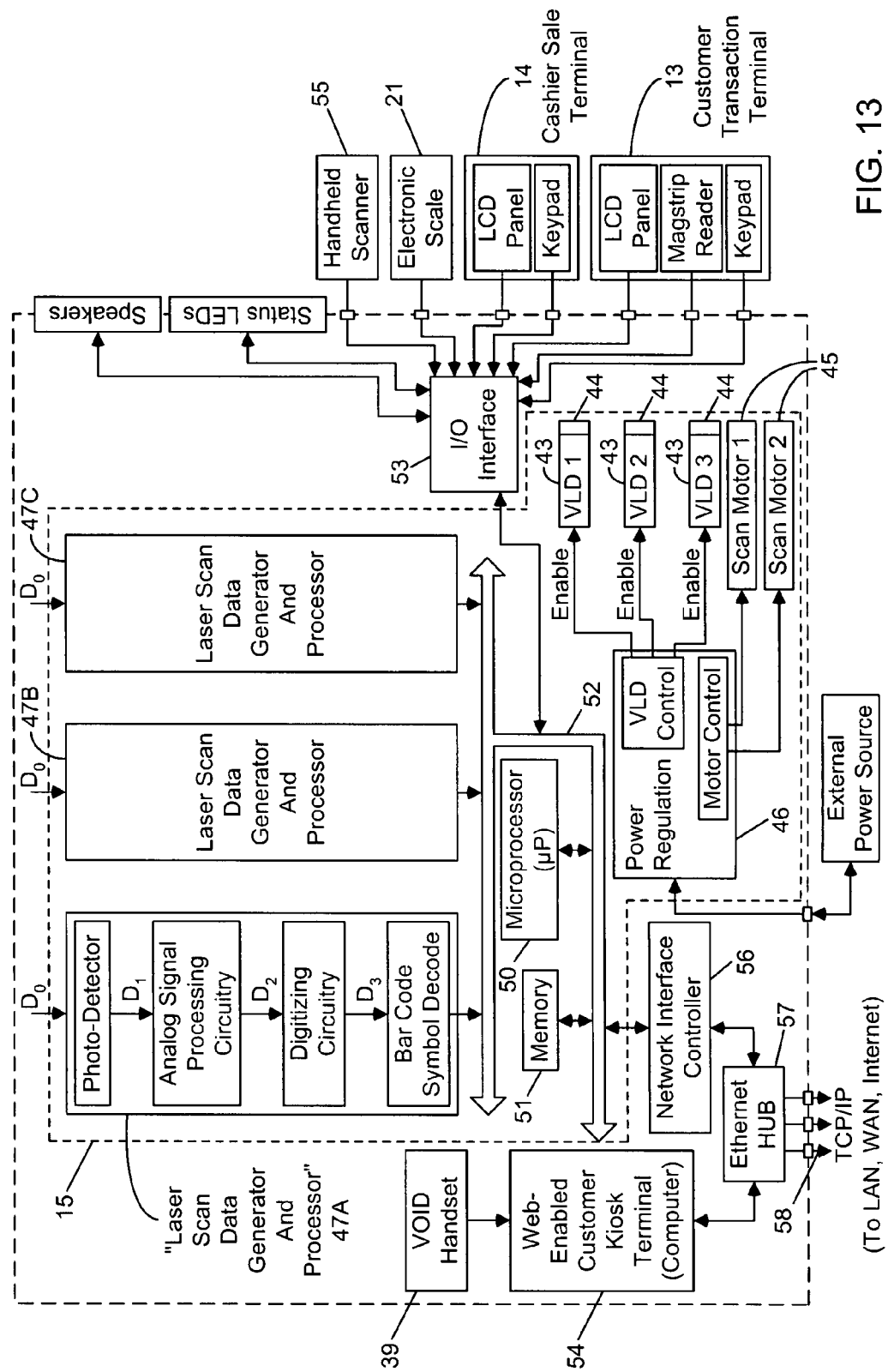
FIG. 13 is a block-schematic representation of the system diagram of the POS-Based Bar Code Reading With An Integrated Internet-Enabled Customer-Kiosk Terminal shown in FIGS. 9 through 12B.

In FIG. 13, a system diagram is provided for the POS-Based Bar Code Reading System With An Integrated Internet-Enabled Customer-Kiosk Terminal 11' illustrated in FIGS. 9 through 12B. As shown, the system 11' comprises: a plurality of VLDs 43, light focusing optics 44, scanning motors 45 power regulation circuitry 46 and scanning optics (as part of unit 15) for producing and scanning laser scanning beams so as to project a laser scanning pattern through the horizontal and vertical scanning windows of the system, and scan bar codes on objects being moved thereby by the cashier, and light collection optics for collecting the focusing the return laser light signal for subsequent photodetection; a plurality of laser scan data generator and processing modules 47A, 47B and 47C, including a plurality of photodetectors, for producing scan data signals D0 through D3, that are ultimately decode-processed in order to produce symbol character data representative of the bar code symbol scanned by the system; a microprocessor 50, memory architecture 51, system bus architecture (having different levels of buses) 52 and an I/O interface 53 connected to such buses for enabling the collection, processing and transport of data elements generated by the various components in the system; cashier-scale terminal 14 having a LCD panel, keypad and associated circuitry; customer-transaction terminal 13 (i.e. having a LCD panel, a keypad, a magstripe reader, and associated circuitry); Internet-enabled customer-kiosk terminal (i.e. computer subsystem) 54 realized as a microcomputing system running an operating system (OS), networking software to support the TCP/IP protocol, Internet access software (e.g. Web browser software such as Microsoft Explorer) to access the WWW and other information resources on the Internet, and peripheral hardware and software components such as a LCD panel 36, touch-screen keypad 37 mounted thereon (forming customer transaction terminal 13), and a speech/voice recognition interface and a bar code symbol reader integrated with the microcomputing system; voice-over-IP telephone handset 39 integrated with the microcomputing system, and having software components running thereon to support its voice communication functions over the Internet, or alternatively, over a Public Telecommunications Switching Network (PTSN) in a manner known in the art; a network interface controller (NIC) card 56 operably connected to system bus architecture 52, for enabling data packet communications over an packet-switched information network (e.g. Internet); an multiport Ethernet hub device 57 connected to the NIC card 56 and the Internet-enabled customer-kiosk terminal 54, so that the entire POS-Based Bar Code Reading System With Internet-Enabled Customer-Kiosk Terminal 11' has one or more Ethernet data ports 55 for operable connection to a TCP/IP network such as a retail LAN which, in turn, is connected to the Internet.

Figure 14:
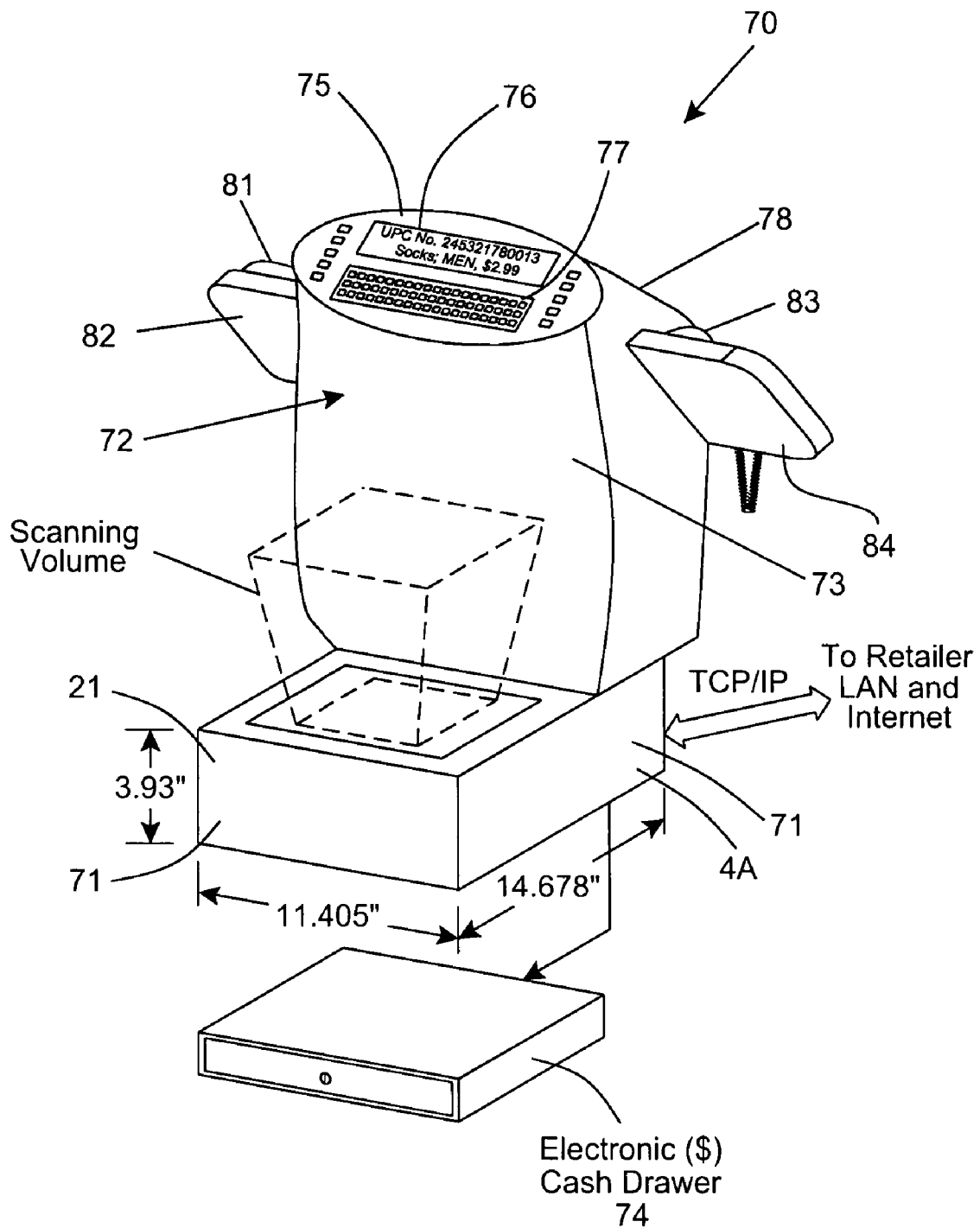
FIG. 14 is the first illustrative of the POS-Based Bar Code Reading Cash Register System With An Integrated Internet-Enabled Customer-Kiosk Terminal of the present invention, wherein a POS-Based Bottom Laser Scanning Unit is integrated with a Cashier-Scale-Transaction-Terminal/Customer-Kiosk-Terminal Unit enclosed in a housing of unitary construction, and having an electronically-controlled cash drawer operably associated with the system.

First Illustrative of the POS-Based Bar Code Reading Cash Register System with an Integrated Internet-Enabled Customer-Kiosk Terminal of the Present Invention In FIG. 14, there is shown is a first illustrative of the POS-Based Bar Code Reading Cash Register System With An Integrated Internet-Enabled Customer-Kiosk Terminal of the present invention 70. As shown, a POS-Based Bottom-Type Laser Scanning Bar Code Reading Unit 71 is integrated with a Cashier-Checkout-Terminal/Customer-Kiosk-Terminal Unit 72 enclosed in a scanner/kiosk housing 73 of generally unitary construction. Also as shown, the system 70 includes an electronically-controlled cash drawer 74 operably associated with the system, and mountable beneath a counter surface in a manner well known in the art.

Figure 15:
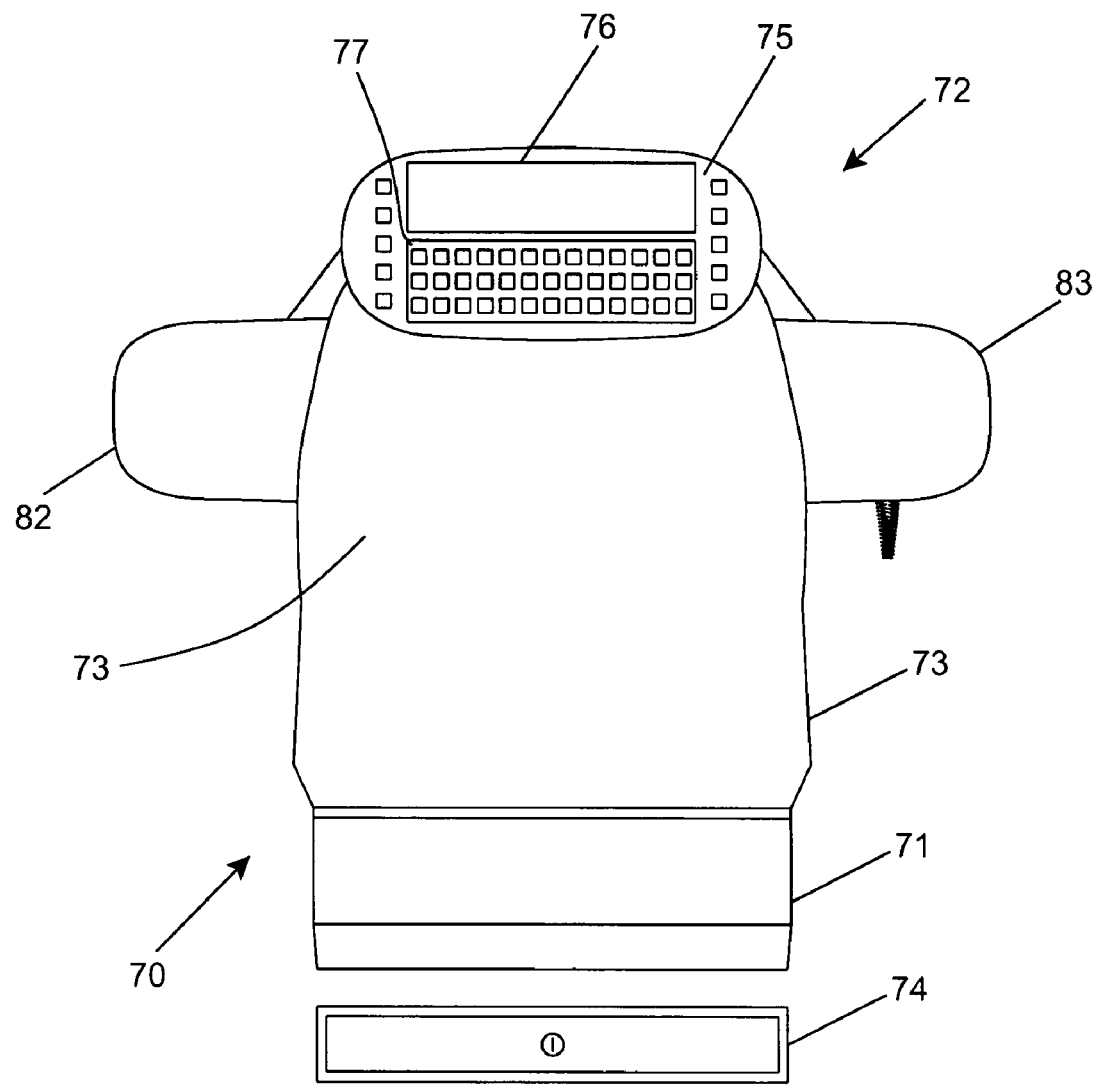
FIG. 15 is an elevated rear view of the POS-Based Laser Scanning Bar Code Reading Cash Register System With An Integrated Internet-Enabled Customer-Kiosk Terminal illustrated in FIG. 14, showing the cashier-scale-transaction terminal (with LCD panel and membrane keyboard) provided on the cashier's side of the system.

As shown in FIG. 15, POS-Based Bar Code Reading Cash Register System With An Integrated And Internet-Enabled Customer-Kiosk Terminal 70 comprises: a cashier-transaction terminal 75 (with a LCD panel 76 and a membrane keyboard 77) provided on the cashier's side of the system; a customer-kiosk transaction terminal 78 (with a LCD panel 79 and a touch-screen keyboard 80 integrated therewith) supported on the customer's side of the system as shown; a financial transaction terminal 81 associated with an ATM submodule 82 mounted to a first side of the scanner/kiosk housing; a hand-set 83 associated with the voice-over-IP phone module 84 mounted to the second side of the scanner/kiosk housing; and a courtesy desk surface 85 disposed beneath the customer-kiosk transaction terminal 78. These components are generally similar to the components described in connection with systems shown in FIGS. 3A and 9, supra.

Figure 16:
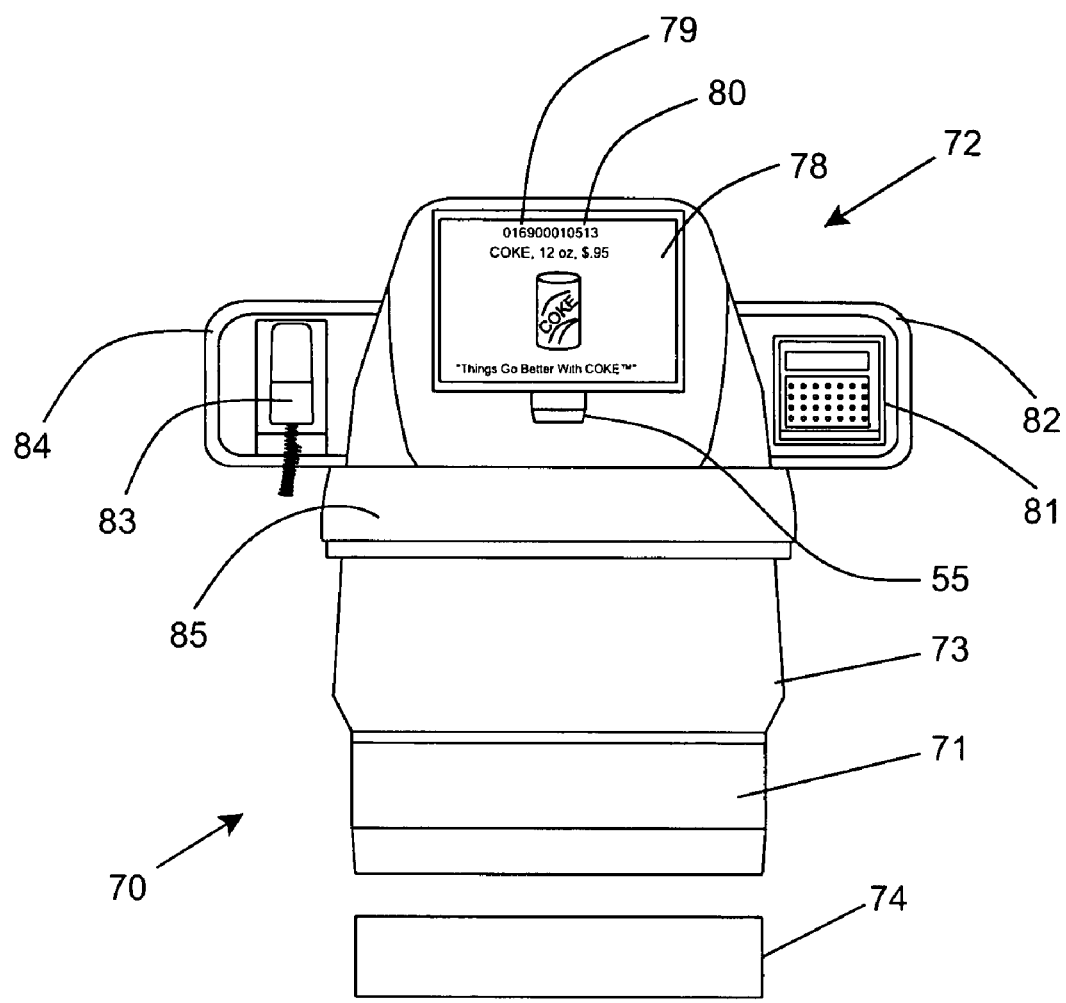
FIG. 16 is an elevated front view of the POS-Based Bar Code Reading Cash Register System With An Integrated Internet-Enabled Customer-Kiosk Terminal illustrated in FIG. 14, showing (i) the customer-kiosk transaction terminal (with LCD panel and touch-screen keyboard integrated therewith) provided on the customer's side of the system, (ii) the transaction terminal associated with the ATM submodule, (iii) the hand-set associated with the voice-over-IP phone module, and (iv) the courtesy desk surface disposed beneath the customer-kiosk transaction terminal.
Figure 17A:
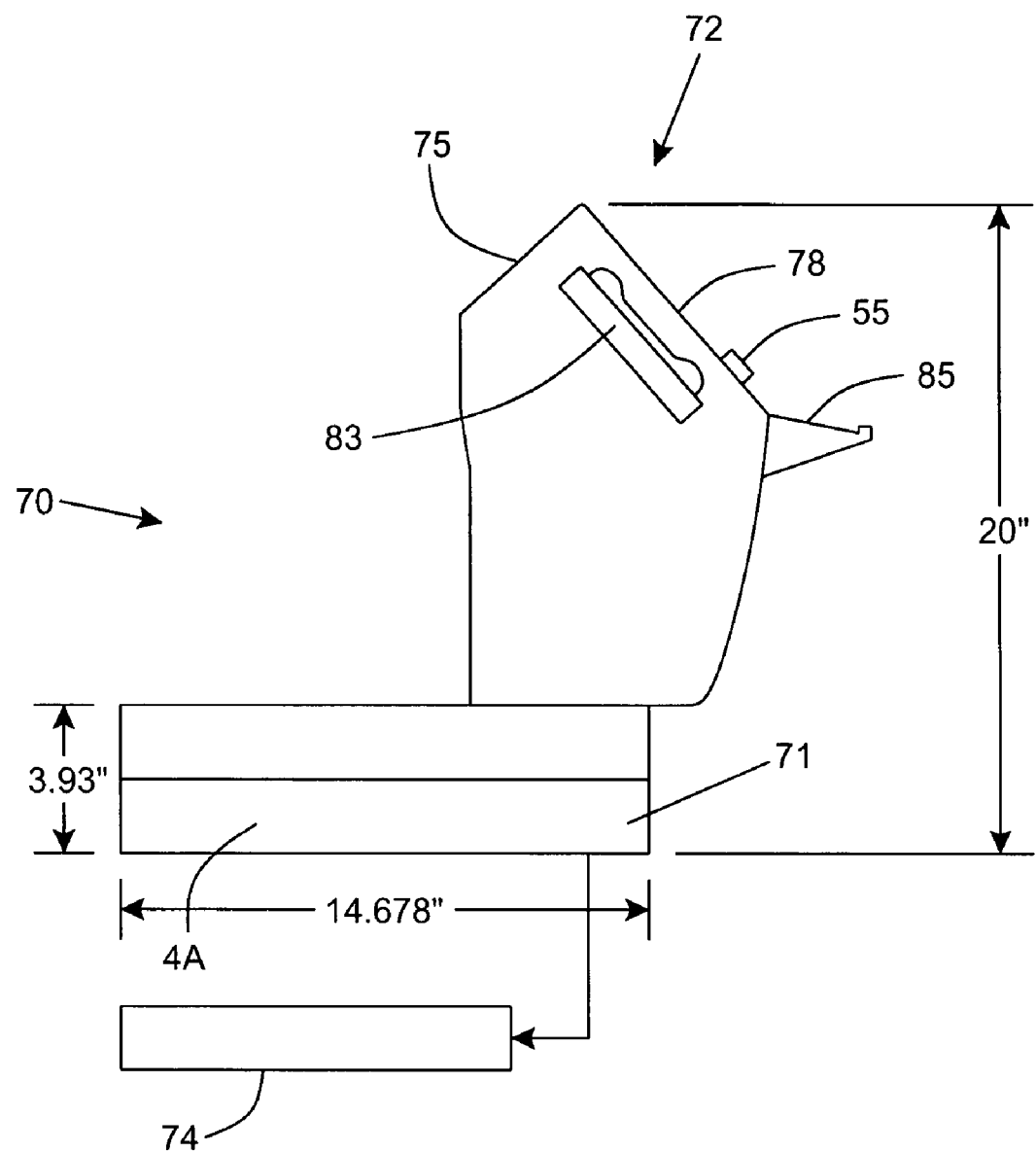
FIG. 17A is an elevated first side view of the POS-Based Bar Code Reading Cash Register System With An Integrated Internet-Enabled Customer-Kiosk Terminal illustrated in FIG. 14.

Front and rear view of the POS-Based Bar Code Reading Cash Register System With An Integrated Internet-Enabled Customer-Kiosk Terminal 70 are shown in FIGS. 15 and 16, and show how the cashier and customer, respectively, face the system during checkout operations. Side views of the POS-Based Bar Code Reading Cash Register System With An Integrated Internet-Enabled Customer-Kiosk Terminal 70 are shown in FIGS. 17A and 17B.

Figure 17B:
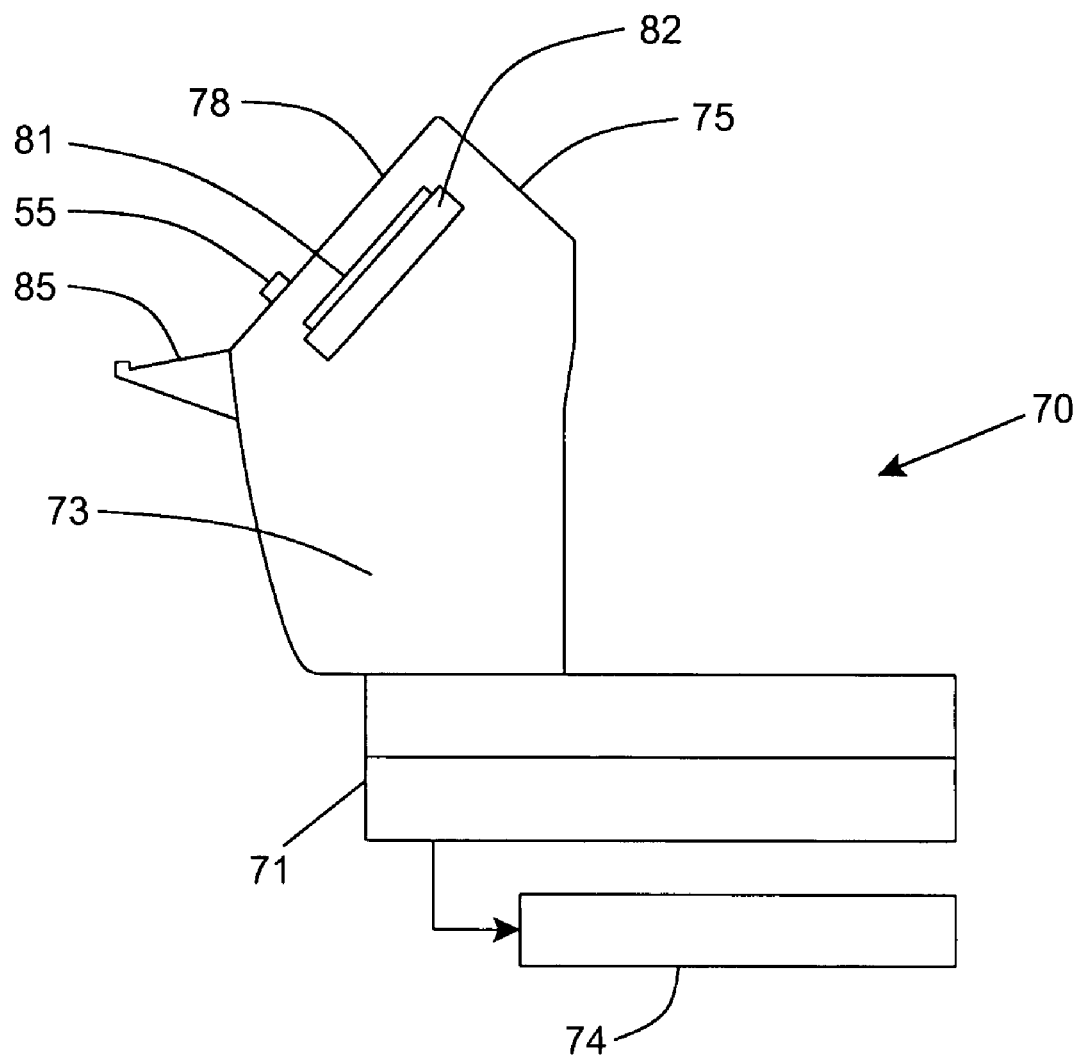
FIG. 17B is an elevated second side view of the POS-Based Bar Code Reading Cash Register System With An Integrated Internet-Enabled Customer-Kiosk Terminal illustrated in FIG. 14.
Figure 18:
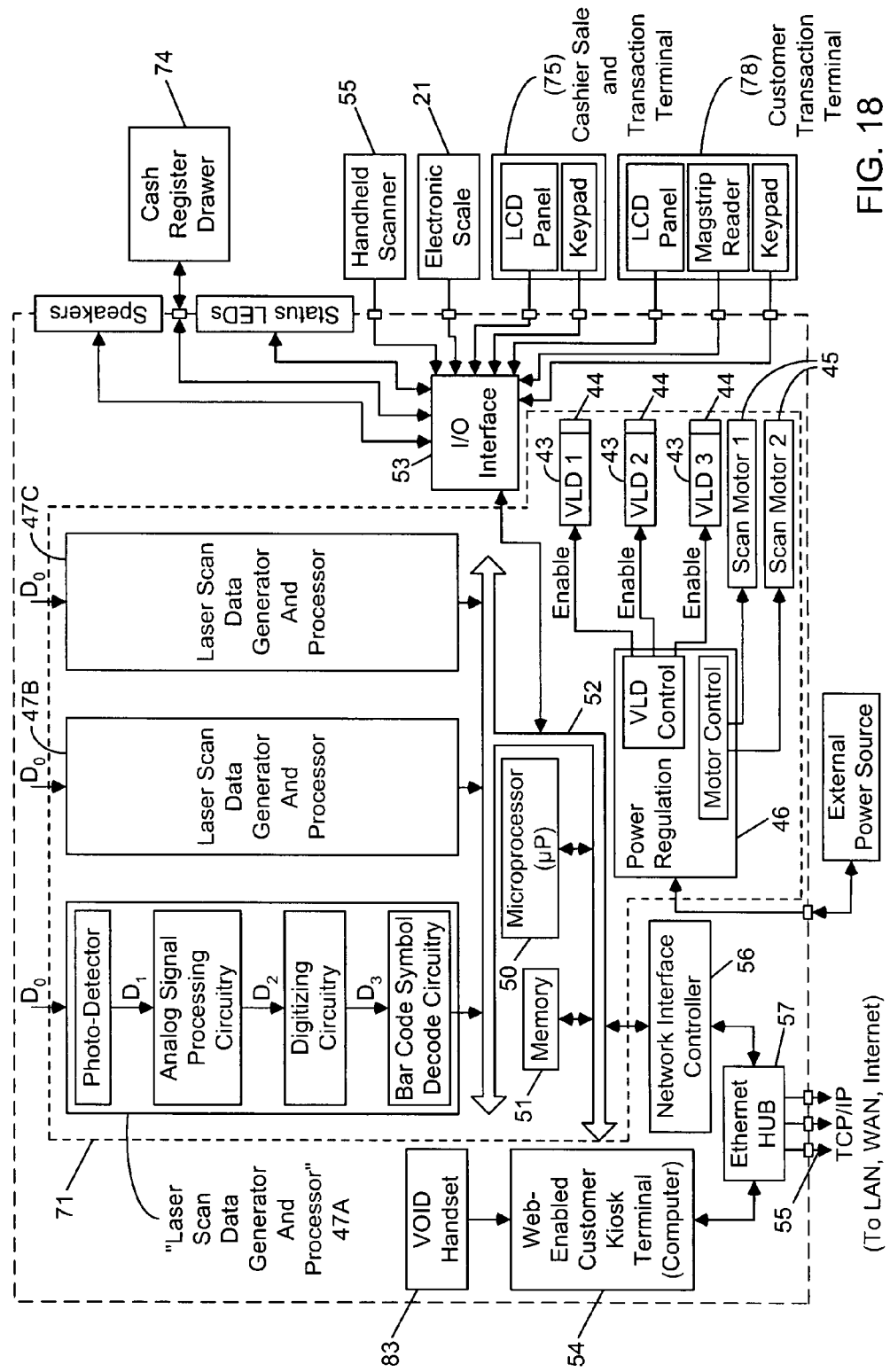
FIG. 18 is a block-schematic representation of the system diagram of the POS-Based Bar Code Reading Cash Register System With An Integrated Internet-Enabled Customer-Kiosk Terminal shown in FIGS. 14 through 17B.

In FIG. 18, a system diagram is provided for the POS-Based Bar Code Reading Cash Register System With An Integrated Internet-Enabled Customer-Kiosk Terminal 70 illustrated in FIGS. 17 through 17B. As shown, the system comprises: a plurality of VLDs 43, light focusing optics 44, scanning motors 45, power regulation circuitry 46, and scanning optics (as part of Unit 71) for producing and scanning laser scanning beams so as to project a laser scanning pattern through the horizontal scanning window of the system, and scan bar codes on objects being moved thereby by the cashier, and light collection optics for collecting the focusing the return laser light signal for subsequent photodetection; a plurality of laser scan data generator and processing modules 47A, 47B and 47C, including a plurality of photodetectors, for producing scan data signals D0 through D3, that are ultimately decode-processed in order to produce symbol character data representative of the bar code symbol scanned by the system; a microprocessor 50, memory architecture 51, system bus architecture (having different levels of buses) 52 and an I/O interface 53 connected to such buses for enabling the collection, processing and transport of data elements generated by the various components in the system; cashier-scale-transaction terminal 75 having LCD panel 76, keypad 77 and associated circuitry, for entering and processing information relating to (i) purchase items to be weighed by the electronic scale subsystem 21, as well as (ii) customer information enabling a consumer transaction to be transacted at the system, and enable the opening of the electronically-controlled cash drawer 74 during the appropriate stage of the consumer transaction; financial transaction terminal 81 (i.e. having LCD panel, keypad, magstripe reader, and associated circuitry); Internet-enabled customer-kiosk terminal (i.e. computer subsystem) 54 realized as a microcomputing system running an operating system (OS), networking software to support the TCP/IP protocol, Internet access software (e.g. Web browser software such as Microsoft Explorer) to access the WWW and other information resources on the Internet, and peripheral hardware and software components such as a LCD panel 79, touch-screen keypad 80 mounted thereon, and a speech/voice recognition interface and a bar code symbol reader integrated with the microcomputing system; voice-over-IP telephone handset 83 integrated with the microcomputing system, and having software components running thereon to support its voice communication functions over the Internet, or alternatively, over a Public Telecommunications Switching Network (PTSN) in a manner known in the art; a network interface controller (NIC) card 56 operably connected to system bus architecture 52, for enabling data packet communications over an packet-switched information network (e.g. Internet); an multiport Ethernet hub device 57 connected to the NIC card and the Internet-enabled customer-kiosk terminal 54, so that entire POS-Based Bar Code Reading System With Internet-Enabled Customer-Kiosk Terminal 70 has one or more Ethernet data ports 55 for operable connection to a TCP/IP network such as a retail LAN which, in turn, is connected to the Internet.

By virtue of its novel construction, the POS-Based Bar Code Reading Cash Register System With An Integrated Internet-Enabled Customer-Kiosk Terminal 70 shown in FIG. 14 is capable of performing all of the functions enabled by the bioptical scanner 28, the ATM terminal 6, the price display panel 3, and the cash register computer 4 configured together in the prior art POS-based checkout counter system shown in FIG. 1. Moreover, the system 70 of the present invention does so in a system form factor having a unitary construction that occupies only a fraction of the space required by prior art system of FIG. 1, while enabling a variety of Internet-based services that offer real value to customers as they are checking out their purchase items.

Figure 19:
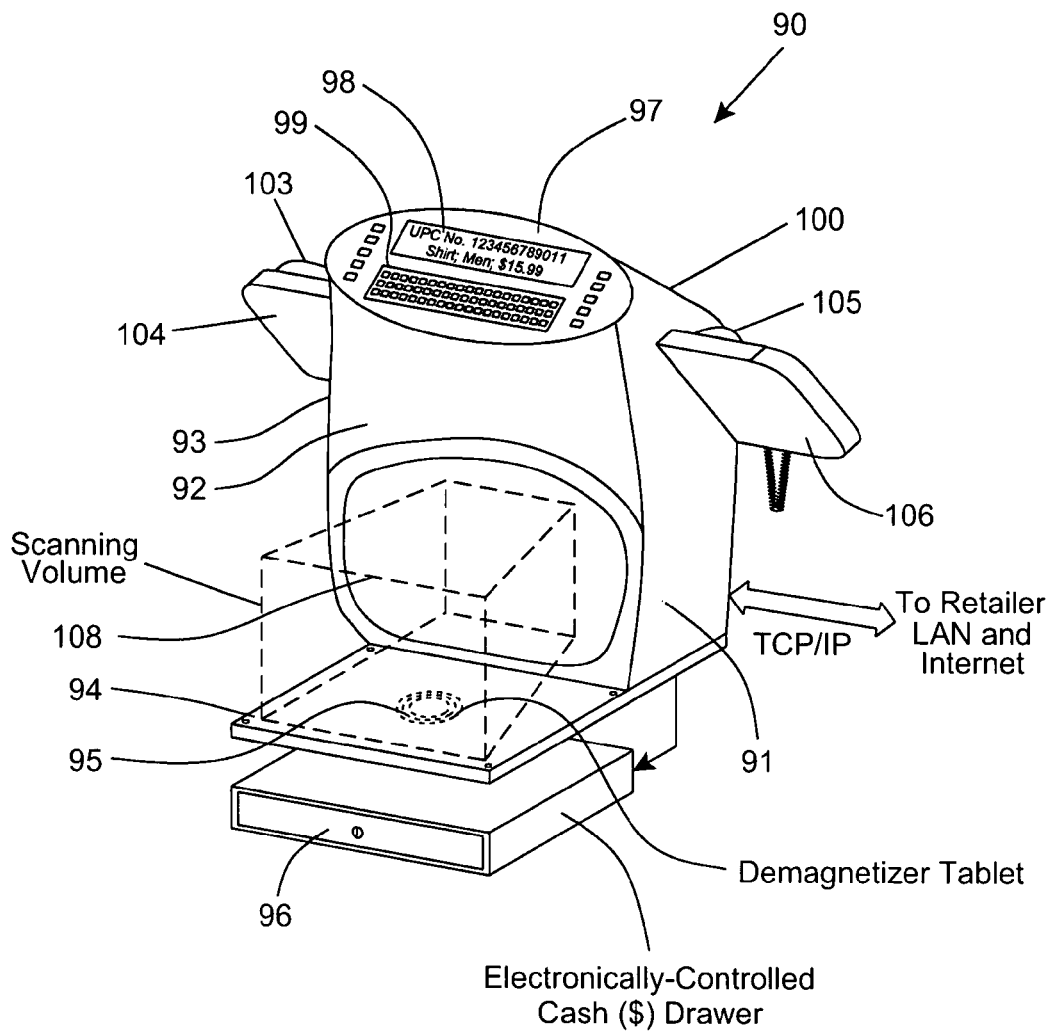
FIG. 19 is a perspective view of the second illustrative of the POS-Based Bar Code Reading Cash Register System With Internet-Enabled Customer-Kiosk Terminal of the present invention, wherein a POS-Based Vertical/Projection Laser Scanning Bar Code Reading Unit is integrated with a Cashier-Transaction-Terminal/Customer-Kiosk-Terminal Unit enclosed in a housing of unitary construction and having an electronically-controlled cash drawer operably associated with the system, and wherein the base portion of the system (mountable to a countertop surface) contains an electromagnetic-based demagnetization coil structure for demagnetizing product security tags, labels and the like during retail checkout operations.

Second Illustrative of the POS-Based Bar Code Reading Cash Register System with an Integrated Internet-Enabled Customer-Kiosk Terminal of the Present Invention In FIG. 19, there is illustrated the second illustrative of the POS-Based Scanning Cash Register System With An Integrated Internet-Enabled Customer-Kiosk Terminal of the present invention 90. As shown therein, a POS-Based Vertical/Projection-Type Laser Scanning Bar Code Reading Unit 91 is integrated with a Cashier-Transaction-Terminal/Customer-Kiosk-Terminal Unit 92 and enclosed in a housing 93 of unitary construction. As there is no horizontal scanning unit in this design, the system is supported upon a relatively thin (e.g. 2") base plate-like structure 94 which contains an electromagnetic-based demagnetization coil structure 95 for demagnetizing product security tags, labels and the like during retail checkout operations. Also, an electronically-controlled cash drawer 96, which can be mounted beneath a counter surface, is operably associated with the system.

Figure 20:
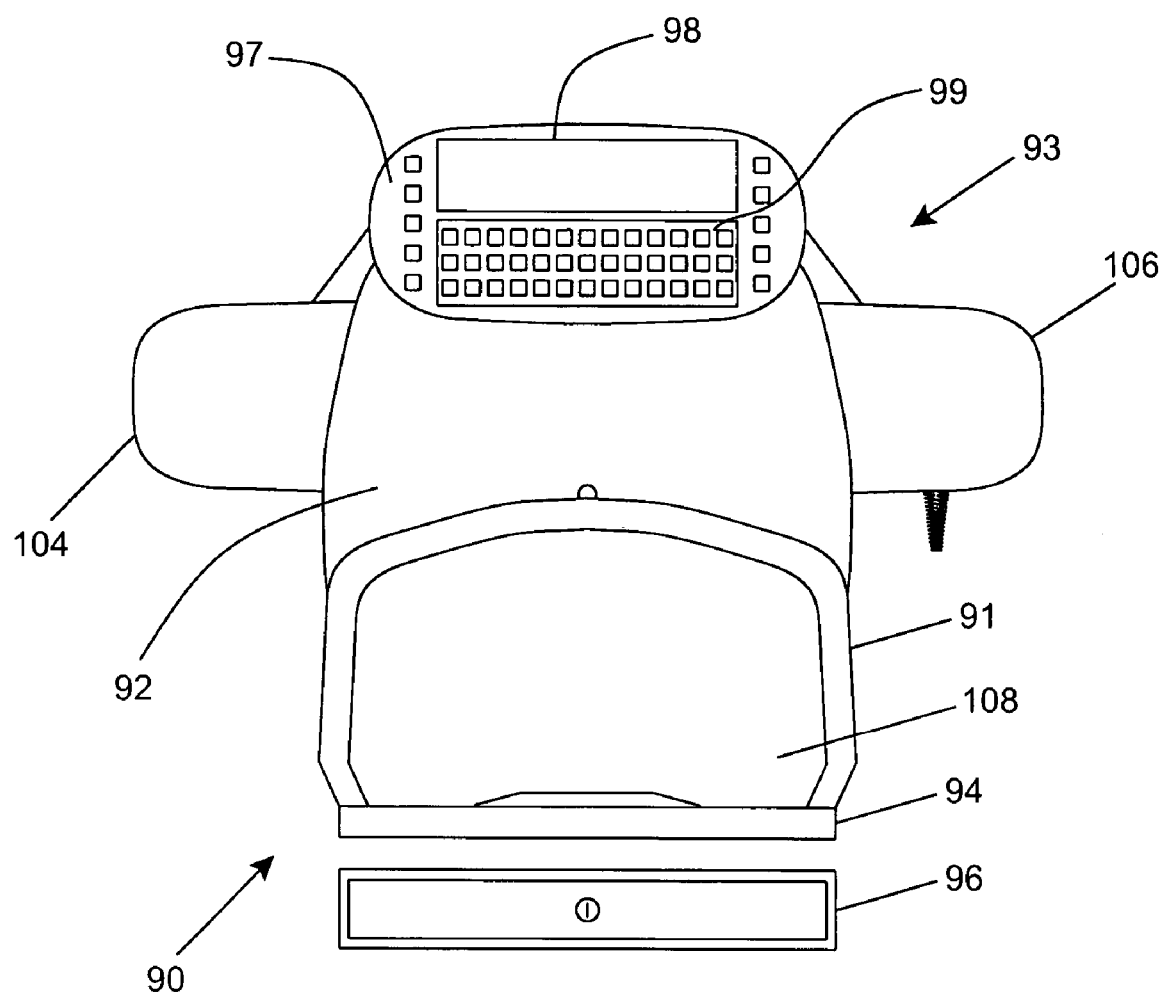
FIG. 20 is an elevated rear view of the POS-Based Bar Code Reading Cash Register System With An Integrated Internet-Enabled Customer-Kiosk Terminal illustrated in FIG. 19, showing the cashier-transaction terminal (with LCD panel and membrane keyboard) provided on the cashier's side of the system.
Figure 21:
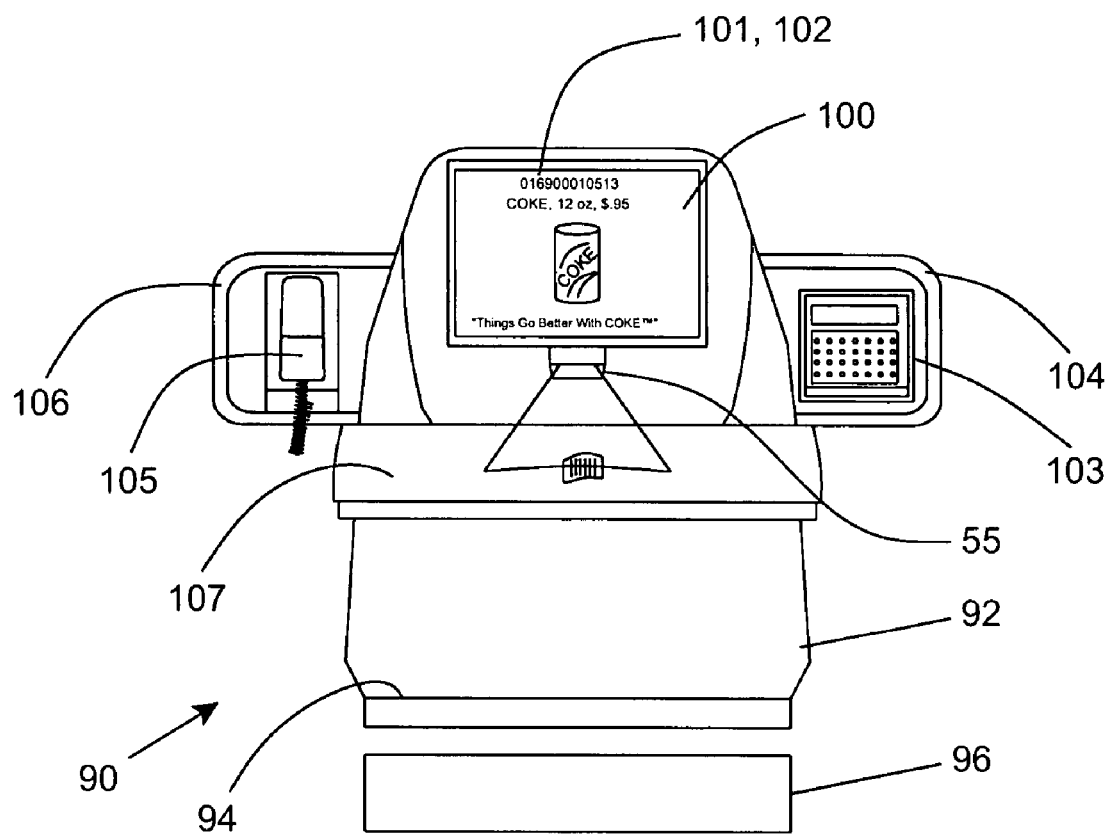
FIG. 21 is an elevated front view of the POS-Based Bar Code Reading Cash Register System With An Integrated Internet-Enabled Customer-Kiosk Terminal illustrated in FIG. 20, showing (i) the customer-kiosk transaction terminal (with LCD panel and touch-screen keyboard integrated therewith) provided on the customer's side of the system, (ii) the transaction terminal associated with the ATM submodule, (iii) the hand-set associated with the voice-over-IP phone module, and (iv) the courtesy desk surface disposed beneath the customer-kiosk transaction terminal.

As shown in FIG. 20, POS-Based Bar Code Reading Cash Register System With An Integrated And Internet-Enabled Customer-Kiosk Terminal 90 comprises: a cashier-transaction terminal 97 (with a LCD panel 98 and a membrane keyboard 99) provided on the cashier's side of the system; a customer-kiosk transaction terminal 100 (with a LCD panel 101 and a touch-screen keyboard 102 integrated therewith) supported on the customer's side of the system; a financial transaction terminal 103 associated with an ATM submodule 104 mounted to a first side of the scanner/kiosk housing 93; a hand-set 105 associated with the voice-over-IP phone module 106 mounted to the second side of the scanner/kiosk housing 93; and a courtesy desk surface 107 disposed beneath the customer-kiosk transaction terminal 100. Most of these components are generally similar to the components described in connection with systems shown in FIG. 14, supra, Front and rear view of the POS-Based Bar Code Reading Cash Register System With An Integrated Internet-Enabled Customer-Kiosk Terminal 90 are shown in FIGS. 20 and 21, and show how the cashier and, respectively, face the system during checkout operations. Side views of the POS-Based Bar Code Reading Cash Register System With An Integrated Internet-Enabled Customer-Kiosk Terminal 90 are shown in FIGS. 22A and 22B.

Figure 22A:
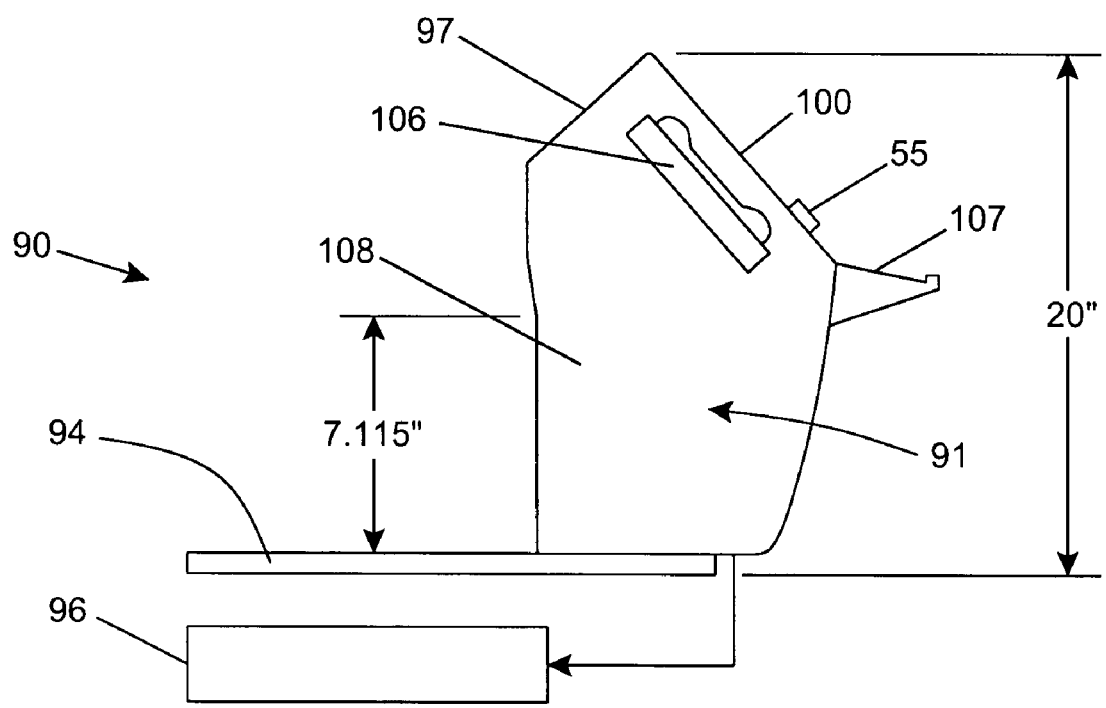
FIG. 22A is an elevated first side view of the POS-Based Bar Code Reading Cash Register System With An Integrated Internet-Enabled Customer-Kiosk Terminal illustrated in FIG. 19.
Figure 22B:
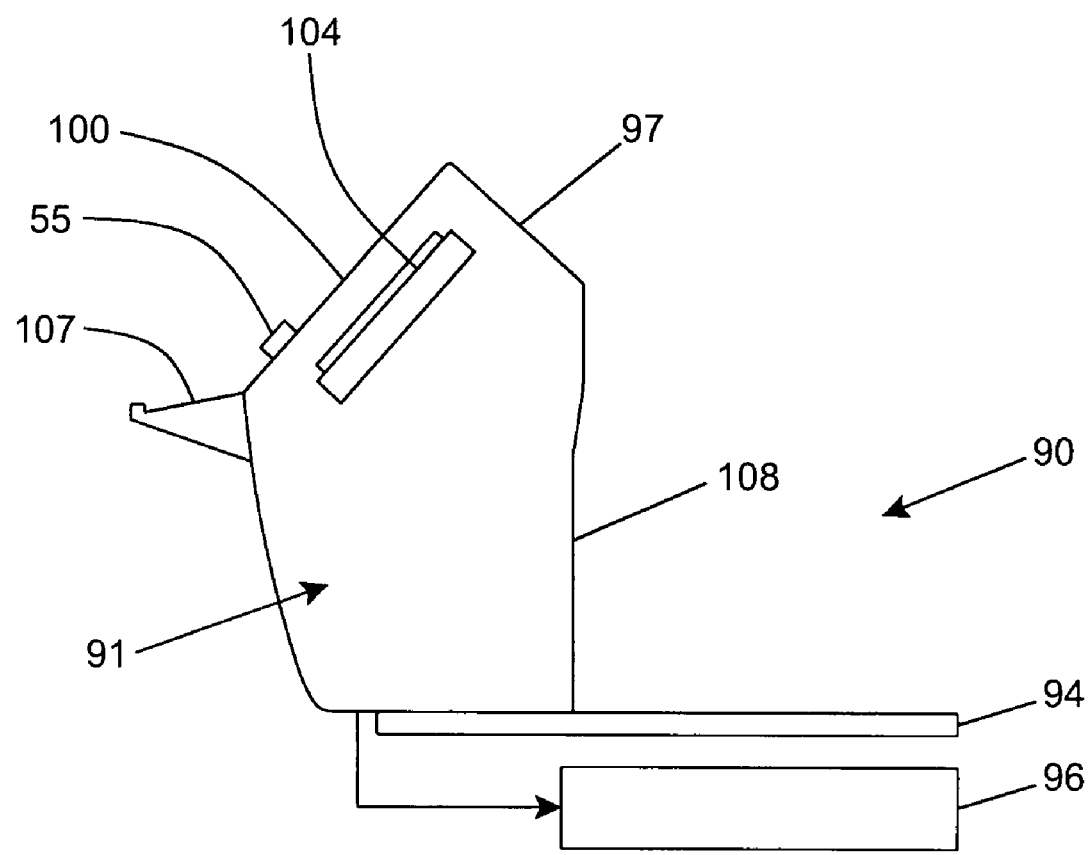
FIG. 22B is an elevated second side view of the POS-Based Bar Code Reading Cash Register System With An Integrated Internet-Enabled Customer-Kiosk Terminal illustrated in FIG. 19.
Figure 23:
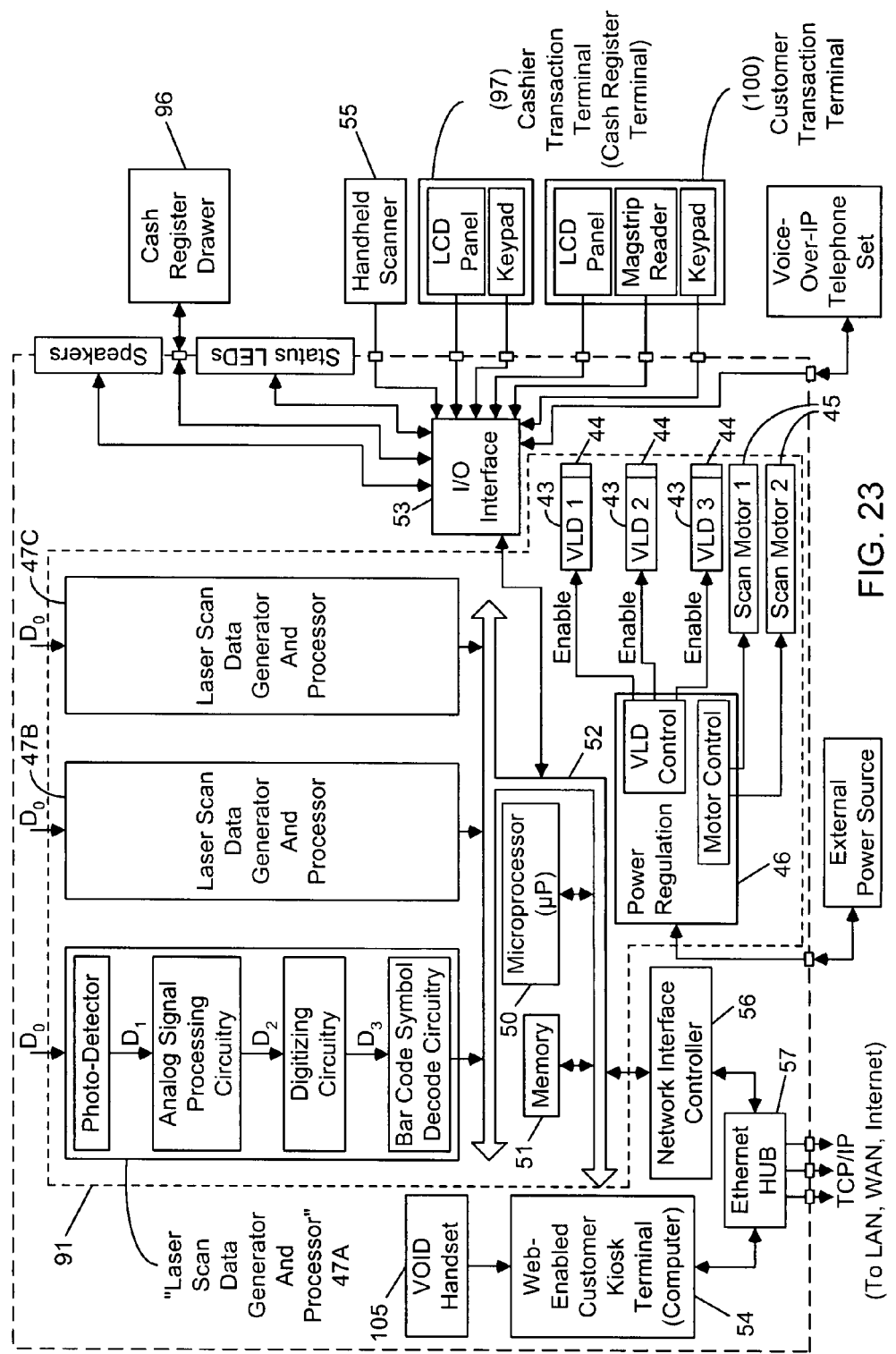
FIG. 23 is a block-schematic representation of the system diagram of the POS-Based Bar Code Reading Cash Register System With An Integrated Internet-Enabled Customer-Kiosk Terminal shown in FIGS. 19 through 22.

In FIG. 23, a system diagram is provided for the POS-Based Bar Code Reading Cash Register System With An Integrated Internet-Enabled Customer-Kiosk Terminal 90 illustrated in FIGS. 22A through 22B. As shown, the system comprises: a plurality of VLDs 43, light focusing optics 44, scanning motors 45, power regulation circuitry 46, and scanning optics (as part of Unit 91) for producing and scanning laser scanning beams so as to project a laser scanning pattern through the vertical scanning window 108 of the system, and scan bar codes on objects being moved thereby by the cashier, and light collection optics for collecting the focusing the return laser light signal for subsequent photodetection; a plurality of laser scan data generator and processing modules 47A, 47B and 47C, including a plurality of photodetectors, for producing scan data signals D0 through D3, that are ultimately decode-processed in order to produce symbol character data representative of the bar code symbol scanned by the system; a microprocessor 50, memory architecture 51, system bus architecture (having different levels of buses) 52 and an I/O interface 53 connected to such buses for enabling the collection, processing and transport of data elements generated by the various components in the system; cashier-transaction terminal 97 having LCD panel 98, keypad 99 and associated circuitry, for entering and processing information relating to (i) purchase items and (ii) customer information to enable a consumer transaction to be transacted at the system, and enable the opening of the electronically-controlled cash drawer 96 during the appropriate stage of the consumer transaction; customer-transaction terminal 103 (i.e. having LCD panel, keypad, magstripe reader, and associated circuitry); Internet-enabled customer-kiosk terminal (i.e. computer subsystem) 54 realized as a microcomputing system running an operating system (OS), networking software to support the TCP/IP protocol, Internet access software (e.g. Web browser software such as Microsoft Explorer) to access the WWW and other information resources on the Internet, and peripheral hardware and software components such as LCD panel 101, touch-screen keypad 102 mounted thereon, and a speech/voice recognition interface and a bar code symbol reader integrated with the microcomputing system; a voice-over-IP telephone handset 105 integrated with the microcomputing system, and having software components running thereon to support its voice communication functions over the Internet, or alternatively, over a Public Telecommunications Switching Network (PTSN) in a manner known in the art; a network interface controller (NIC) card 56 operably connected to system bus architecture 52, for enabling data packet communications over an packet-switched information network (e.g. Internet); an multiport Ethernet hub device 57 connected to the NIC card and the Internet-enabled customer-kiosk terminal 54, so that entire POS-Based Bar Code Reading System With Internet-Enabled Customer-Kiosk Terminal 90 has one or more Ethernet data ports 55 for operable connection to a TCP/IP network such as a retail LAN which, in turn, is connected to the Internet.

By virtue of its novel construction, the POS-Based Bar Code Reading Cash Register System With An Integrated Internet-Enabled Customer-Kiosk Terminal 90 shown in FIG. 19 is capable of performing all of the functions enabled by the bioptical scanner 2, the ATM terminal 6, the price display panel 3, and the cash register computer 4 configured together in the prior art POS-based checkout counter system 1 shown in FIG. 1. Moreover, system 90 of the present invention does so in a system form factor having a unitary construction that occupies only a fraction of the space required by the prior art system of FIG. 1, while enabling a variety of Internet-based services that offer real value to customers as they are checking out their purchase items.

Modifications

While the various embodiments of the laser scanning bar code reading subsystems employed in the systems of the present invention have been described in connection with linear (1-D) bar code symbol scanning applications, it should be clear, however, that the scanning apparatus and methods of the present invention are equally suited for scanning 2-D bar code symbols, as well as alphanumeric characters (e.g. textual information) in optical character recognition (OCR) applications, as well as scanning graphical images in graphical scanning arts. It is also understood that the bar code reading subsystems employed in the systems of the present invention can be realized as image-based bar code reading systems as taught in copending U.S. application Ser. No. 09/954,477 filed on Sep. 17, 2001, incorporated herein by reference.

Several modifications to the illustrative embodiments have been described above. It is understood, however, that various other modifications to the illustrative embodiment of the present invention will readily occur to persons with ordinary skill in the art. All such modifications and variations are deemed to be within the scope and spirit of the present invention as defined by the accompanying Claims to Invention.

What is claimed is:

1. A POS-based checkout system configured to enable the reading of code symbols on cashier and customer sides of the POS-based checkout system, during a retail transaction being carried out at a point-of-sale (POS) station, said POS-based checkout system comprising:

a housing for installation in or on a countertop surface at said POS station, and having surfaces defining a cashier's side, and a customer's side of said POS-based checkout system;

a computer network interface installed within said housing;

a computing subsystem, disposed in said housing, and operably connected to said computer network, for running programs;

a first code symbol reading unit integrated within said housing, operably connected to said computing subsystem, and having a first scanning window for scanning code symbols on products passed through a first scanning region provided on said cashier's side;

a cashier terminal integrated with said housing on said cashier's side, operably connected to said computing subsystem, and having a first visual display panel and a first manual data entry device integrated within said housing on said cashier's side;

a second code symbol reading unit installed on said customer's side, operably connected to said computer subsystem, and having a second scanning window for scanning code symbols on objects passed through a second scanning region provided on said customer's side;

a customer terminal integrated with said housing, operably connected to said computer subsystem, and arranged on said cashier's side, directly opposite said cashier terminal, and having a second visual display panel and second manual data entry device integrated with said housing on said customer's side, so that the cashier and customer are facing each other during a retail transaction conducted at said POS-based checkout system;

wherein said first code symbol reading unit allows the cashier to read code symbols passed through said first scanning region, and said cashier terminal allows the cashier to enter data into said computing subsystem and display information on said first display panel; and wherein said second code symbol reading unit allows the consumer to read code symbols passed through said second scanning region, and said customer terminal allows the customer to enter data into said computing subsystem and display information on said second display panel, including price information associated with products that have been scanned by the cashier using said first code symbol reading unit.

2. The POS-based checkout system 1, wherein said first code symbol reading unit comprises a laser scanning type bar code symbol reader.

3. The POS-based checkout system of claim 1, wherein said second code symbol reading unit comprises an imaging-type of bar code symbol reader for use by said customer.

4. The POS-based checkout system of claim 1, wherein said customer terminal displays advertisements or promotions on said second display panel while the cashier is not scanning products.

5. The POS-based checkout system of claim 1, wherein said customer terminal comprises an automated teller machine (ATM) module and a phone module integrated to said housing on said customer's side.

6. The POS-based checkout system of claim 1, wherein said computing subsystem has an operating system (OS), networking software to support transmission control protocol/internet protocol (TCP/IP) protocol, and information network access software to access the world wide web (WWW) and other information resources over a communication network.

7. The POS-based checkout system of claim 6, wherein said computing subsystem further comprises a network interface controller operably connected to a system bus architecture, for enabling data packet communications over said computer network; and wherein a multi-port Ethernet hub device is connected to said network interface controller and said customer terminal, so that said computing subsystem has one or more Ethernet data ports for operable connection to said communication network interface.

8. The POS-based checkout system of claim 1, wherein said first visual display panel is realized as a first liquid crystal display (LCD) panel, and said second display panel is realized as a second liquid crystal display (LCD) panel.

9. The POS-based checkout system of claim 7, wherein said first manual data entry device is realized as a first touch-screen keypad mounted on said first liquid crystal display (LCD) panel.

10. The POS-based checkout system of claim 7, wherein said second manual data entry device is realized as a second touch-screen keypad mounted on said second liquid crystal display (LCD) panel.

11. The POS-based checkout system of claim 1, wherein said cashier's side further includes an electronic produce scale integrated within a portion of said housing, for weighing produce and displaying a computed price on said first display panel.

12. The POS-based checkout system of claim 1, wherein said code symbols includes 1D bar code symbols, 2D bar code symbols, and data matrix symbols.

* * * * *